(12) United States Patent
Kelley

(10) Patent No.: US 11,655,802 B1
(45) Date of Patent: May 23, 2023

(54) ATMOSPHERIC ENERGY RECOVERY

(71) Applicant: William A. Kelley, Vail, CO (US)

(72) Inventor: William A. Kelley, Vail, CO (US)

( * ) Notice: Subject to any disclaimer, the term of this patent is extended or adjusted under 35 U.S.C. 154(b) by 0 days.

(21) Appl. No.: 18/150,738

(22) Filed: Jan. 5, 2023

(51) Int. Cl.
*F03G 6/04* (2006.01)
*F03G 7/06* (2006.01)
*F03G 7/04* (2006.01)

(52) U.S. Cl.
CPC ............... *F03G 6/04* (2013.01); *F03G 7/04* (2013.01); *F03G 7/06112* (2021.08)

(58) Field of Classification Search
CPC .... F02G 1/04–06; F02G 2254/05; F03G 7/04; F03G 7/06; F03G 7/06112; F03G 7/06113; F03G 6/00; F03G 6/002; F03G 6/02; F03G 6/04; F03G 6/121
See application file for complete search history.

(56) References Cited

U.S. PATENT DOCUMENTS

| | | | | |
|---|---|---|---|---|
| 3,451,342 A * | 6/1969 | Schwartzman | ......... | F01K 25/10 60/641.1 |
| 4,309,619 A * | 1/1982 | Cahill | ............. | F03G 7/04 290/1 R |
| 4,624,109 A * | 11/1986 | Minovitch | ............. | F01K 25/10 60/648 |
| 5,537,823 A * | 7/1996 | Vogel | ............. | F02G 1/0435 60/590 |
| 2009/0165461 A1* | 7/2009 | Klassen | ............. | F03G 6/00 60/645 |
| 2011/0179788 A1* | 7/2011 | Hurtado | ............. | F03G 7/06 60/641.6 |
| 2012/0247734 A1 | 10/2012 | Kelley | | |
| 2012/0279479 A1 | 11/2012 | Kelley | | |
| 2014/0202152 A1* | 7/2014 | Lew | ............. | F01C 21/08 60/641.1 |
| 2014/0283547 A1 | 9/2014 | Kelley | | |
| 2014/0298762 A1 | 10/2014 | Kelley | | |
| 2014/0298847 A1 | 10/2014 | Kelley | | |
| 2015/0096298 A1* | 4/2015 | Benn | ............. | F03G 7/04 60/641.2 |

(Continued)

FOREIGN PATENT DOCUMENTS

| | | | | |
|---|---|---|---|---|
| GB | 2442976 A | * | 4/2008 | ............. F03G 6/00 |
| WO | WO-2004101991 A1 | * | 11/2004 | ............. F03G 6/00 |
| WO | WO-2018201262 A1 | * | 11/2018 | ............. F03G 6/00 |

*Primary Examiner* — Mark A Laurenzi
*Assistant Examiner* — Xiaoting Hu
(74) *Attorney, Agent, or Firm* — Dickinson Wright PLLC; Mark E. Scott

(57) ABSTRACT

Atmospheric solar energy recovery. At least one example is a method comprising: warming a first fluid from heat in atmospheric air, the warming creates an increase in volume of the first fluid; moving a working piston by the increase in volume of the first fluid during the warming, the movement to a first position; holding the working piston in the first position to create a first fixed working volume; exchanging heat in first fluid with a second fluid while the working piston is held in the first position, thereby reducing pressure of the first fluid below atmospheric pressure; and then releasing the working piston; moving the working piston by a first differential pressure between atmospheric pressure and pressure of the first fluid; and converting movement of the working piston caused by the first differential pressure into usable work.

18 Claims, 11 Drawing Sheets

(56) References Cited

U.S. PATENT DOCUMENTS

| | | | |
|---|---|---|---|
| 2015/0192333 A1 | 7/2015 | Kelley | |
| 2015/0369221 A1* | 12/2015 | Minovitch | F03G 7/00 60/641.6 |
| 2016/0209082 A1* | 7/2016 | Yang | F03G 7/06 |
| 2017/0361274 A1 | 12/2017 | Kelley | |
| 2018/0320518 A1* | 11/2018 | Wei | F01B 7/16 |
| 2022/0107143 A1* | 4/2022 | Santander Kuborn | F03G 7/06113 |

* cited by examiner

ATMOSPHERIC ENERGY RECOVERY

CROSS-REFERENCE TO RELATED APPLICATIONS

Not Applicable.

BACKGROUND

Currently, solar energy is collected through the use of solar panels, which only allow for collection when direct sunlight is available. However, direct sunlight is not available for sufficient periods each day to provide a consistent and efficient source of energy. Despite what is suggested by use of solar panels, solar energy is not exclusively available from direct sunlight.

Nearly twenty-three percent of the solar energy that enters Earth's atmosphere system is absorbed by the atmosphere and manifests itself as warmth or heat energy. In fact, at standard temperature and pressure, there are approximately 180 Joules of gas phase energy per liter of air. Nonetheless, this abundance of heat energy is greatly left uncollected and underutilized. The lack of scientific or engineering efforts to collect atmospheric heat energy is based upon centuries-old reasoning that heat energy in the atmosphere is insufficient to power heat engines. This antiquated belief has stifled innovation.

SUMMARY

One example is a method of extracting energy from atmospheric air, the method comprising: warming a first fluid from heat in atmospheric air, the warming creates an increase in volume of the first fluid; moving a working piston by the increase in volume of the first fluid during the warming, the movement to a first position; holding the working piston in the first position to create a first fixed working volume; exchanging heat in first fluid with a second fluid while the working piston is held in the first position, thereby reducing pressure of the first fluid below atmospheric pressure; and then releasing the working piston; moving the working piston by a first differential pressure between atmospheric pressure and pressure of the first fluid; and converting movement of the working piston caused by the first differential pressure into usable work.

In the example method, exchanging heat in the first fluid with the second fluid may further comprise moving heat from the first fluid to the second fluid by way of a counter-flow heat exchanger.

In the example method, exchanging heat in the first fluid with the second fluid may further comprises moving heat while maintain the first fluid in a gaseous state.

In the example method, exchanging heat in the first fluid with the second fluid may further comprise moving heat and thereby transitioning the first fluid to a liquid state.

The example method may further comprise, after moving the working piston by the first differential pressure: holding the working piston in a second position to create a second fixed working volume smaller than the first fixed working volume; exchanging heat from the second fluid with the first fluid while the working piston is held in the second position, thereby increasing the pressure of the first fluid above atmospheric pressure; and then releasing the working piston; moving the working piston by a second differential pressure between atmospheric pressure and the first fluid; and converting movement of the working piston caused by the second differential pressure into usable work. Converting movement of the working piston caused by the first differential pressure may further comprise converting the movement of the working piston caused by the first differential pressure to electrical energy using the electrical generator; and converting movement of the working piston caused by the second differential pressure may further comprise converting the movement of the working piston caused by the second differential pressure to electrical energy using the electrical generator. The electrical generator may be a linear electric motor.

In the example method, warming the first fluid from heat in atmospheric air may further comprise warming the first fluid being at least one selected from a group comprising: helium; neon; and nitrogen.

Another example is a system for recovering atmospheric energy, the system comprising: a first warming cylinder having a first warming piston therein, the first warming cylinder exposed to atmospheric temperature, and the first warming cylinder and the first warming piston define a first warming-active volume; a first cryo cylinder having a first cryo piston therein, the first cryo cylinder disposed within a region of cryogenic temperature, and the first cryo cylinder and the first cryo piston define a first cryo-active volume; a second warming cylinder having a second warming piston therein, the second warming cylinder exposed to atmospheric temperature, and the second warming cylinder and the second warming piston define a second warming-active volume; a second cryo cylinder having a second cryo piston therein, the second cryo cylinder disposed within the region of cryogenic temperature, and the second cryo cylinder and the second cryo piston define a second cryo-active volume; a heat exchanger defining a first flow path that fluidly couples the first warming-active volume to the first cryo-active volume, and a second flow path that fluidly couples the second warming-active volume to the second cryo-active volume; a working cylinder having a working piston therein, the working cylinder exposed to atmospheric temperature, and the working cylinder and the working piston defining a working volume fluidly coupled to the first warming-active volume; a first fluid disposed in the first warming-active volume, the first cryo-active volume, and the working volume; a second fluid disposed in the second warming-active volume and the second cryo-active volume; a means for extracting energy from movement of the working piston; a first means for controlling position of the first warming piston and the first cryo piston; a second means for controlling position of the second warming piston and the second cryo piston; and a controller coupled to the means for extracting energy, the first means for controlling position, and the second means for controlling position. The controller may be configured to: position the first warming piston and the first cryo piston such that a majority of the first fluid resides in the first warming-active volume and the working volume, thereby warming the first fluid from heat in atmospheric air, and the warming creates an increase in volume of the first fluid and move the working piston to a first position; hold the working piston in the first position to create a first fixed working volume; move the first warming piston and first cryo piston, and move the second warming piston and the second cryo piston, to exchange heat in first fluid with the second fluid by way of the heat exchanger while the working piston is held in the first position, thereby reducing pressure of the first fluid below atmospheric pressure and creating a first differential pressure across the working piston; and then release the working piston; and convert movement of the working piston caused by the first differential pressure into usable work by the means for extracting energy.

In the example system, the controller may be further configured to, after converting movement of the working piston caused by the first differential pressure into electrical energy: hold the working piston in a second position to create a second fixed working volume smaller than the first fixed working volume; move the first warming piston and the first cryo piston, and move the second warming piston and the second cryo piston, to exchange heat in the second fluid with the first fluid by way of the heat exchanger while the working piston is held in the second position, thereby increasing the pressure of the first fluid above atmospheric pressure and creating a second differential pressure; and then release the working piston; and convert movement of the working piston caused by the second differential pressure into usable work by the means for extracting energy.

In the example system, the first means for controlling position may further comprise: a connecting rod coupled on a first end to the first warming piston and coupled on a second end to the first cryo piston; and a means for translating the connecting rod, the first warming piston, and the first cryo piston. The means for translating may further comprises an electric motor.

In the example system, the means for extracting energy may further comprise a linear electric motor.

In the example system, the first fluid may be at least one selected from a group comprising: helium; neon; and nitrogen.

In the example system, the second fluid is helium.

In the example system, the first fluid may remain in a gas phase during movement between the first warming piston and first cryo piston.

In the example system, the second fluid may remain in a gas phase during movement between the second warming piston and second cryo piston.

In the example system, the first fluid may change from a gas phase to a liquid phase during movement between the first warming piston and first cryo piston.

BRIEF DESCRIPTION OF THE DRAWINGS

For a detailed description of example embodiments, reference will now be made to the accompanying drawings, not necessarily to scale, in which.

DEFINITIONS

Figure 1:
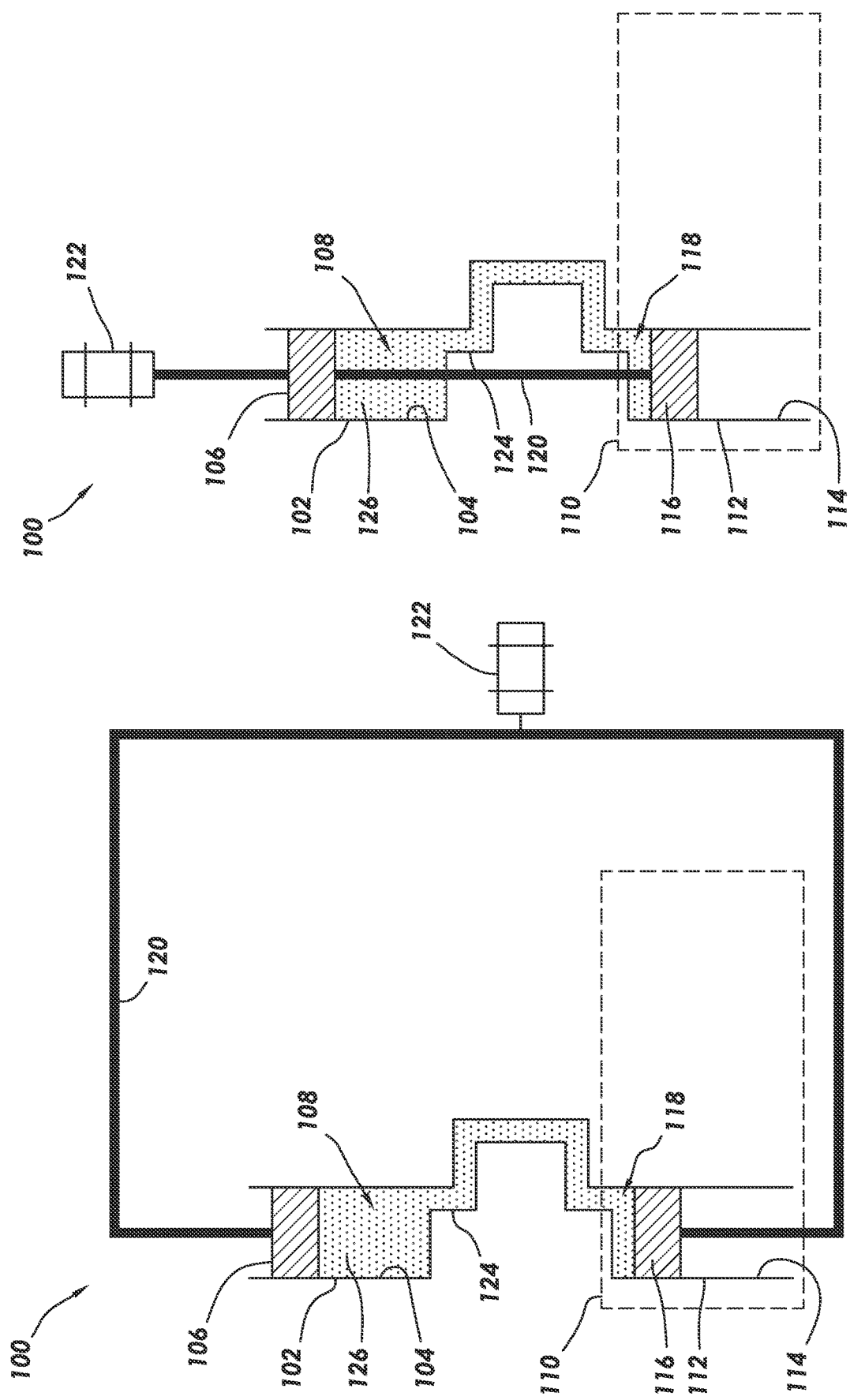
FIG. 1A shows a cross-sectional schematic view of a piston pair in accordance with at least some embodiments.
FIG. 1B shows a cross-sectional schematic view of a piston pair in accordance with at least some embodiments.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

"Cryogenic temperature" shall mean a temperature below 90 degrees Kelvin (° K).

"Controller" shall mean, alone or in combination, individual circuit components, an application specific integrated circuit (ASIC), a microcontroller with controlling software, a reduced-instruction-set computing (RISC) with controlling software, a digital signal processor (DSP), a processor with controlling software, a programmable logic device (PLD), a field programmable gate array (FPGA), a programmable system-on-a-chip (PSOC), and/or a computer system configured to read inputs and drive outputs responsive to the inputs.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Various examples are directed to systems and methods for atmospheric energy recovery. More particularly, example embodiments are directed to methods and systems to utilize the atmosphere as a collector of solar energy, and to extract the solar energy collected by the atmosphere for useful purposes. By using the atmosphere, rather than direct sunlight, as the collector, the various examples enable stable, consistent, and efficient conversion of atmospheric heat energy independent of direct sunlight or particular weather conditions.

Extracting solar energy using the atmosphere as the collector may involve the use of interacting mechanical systems, the interacting mechanical systems exchange heat energy with each other and extract heat energy from the atmosphere. The exchanging and extraction of heat energy causes changes in pressure of working fluids within each subsystem. The description starts with partial system to orient the reader to the interactions of temperature and pressure of the working fluid.

FIG. 1A shows a cross-sectional schematic view of an example piston pair. In particular, the piston pair 100 comprises a warming cylinder 102, shown in cross-section. The warming cylinder 102 in various examples is constructed of a metallic material and the exterior of the warming cylinder 102 is exposed to atmospheric temperature and pressure. The warming cylinder 102 defines a cylinder bore 104 having a warming piston 106 disposed therein. The combination of the cylinder bore 104 within the warming cylinder 102 and the warming piston 106 define a warming-active volume 108. The volume defined by the warming-active volume 108 is variable depending on the position of the warming piston 106 within the warming cylinder 102.

The example piston pair 100 further includes a cryo cylinder 112, also shown in cross-section. The cryo cylinder 112 in various examples is constructed of a metallic material. The cryo cylinder 112 defines a cylinder bore 114 having a cryo piston 116 disposed therein. The combination of the cylinder bore 114 within the cryo cylinder 112 and the cryo piston 116 define a cryo-active volume 118. The volume defined by the cryo-active volume 118 is variable depending on the position of the cryo piston 116 within the cryo cylinder 112.

The cryo cylinder 112 is disposed within a region of cryogenic temperatures, illustrated as cryogenic region 110. Cryogenic region 110 may take any suitable form, such as an insulated volume having a cooling fluid therein, and the cooling fluid is cooled to cryogenic temperatures. In one example, the temperature within the cryogenic region 110 may be about one degree Kelvin (° K). Such cryogenic temperatures are readily achievable with existing equipment, for example, magnetic resonance imaging (MRI) machines have cryogenic regions that operate within this range. Thus, the exterior surface of the cryo cylinder 112 is exposed to cryogenic temperatures. The metallic material of the cryo cylinder 112 is thermally isolated from the metallic material of the warming cylinder 102 to reduce unwanted heat energy migrating into the cryogenic region 110.

In one example system, the warming piston 106 and the cryo piston 116 are coupled together by a connecting rod 120. The shape of the connecting rod 120, connecting around the outside of the piston pair 100, is meant only to show a mechanical connection between the pistons, and not to define the actual physical shape of the connecting rod 120. In particular, the connecting rod 120 defines a first end coupled to the warming piston 106. Additionally, the connecting rod 120 defines a second end coupled to the cryo piston 116. In the example arrangement, the connecting rod 120 fixes the physical relationship of the warming piston 106 and the cryo piston 116. The position of the connecting rod 120 may be shifted, thus changing the positions of the warming piston 106 and the cryo piston 116, the shifting in any suitable form. FIG. 1 illustratively shows a linear actuator 122 coupled to the connecting rod 120 to enable the movement of the connecting rod 120 and pistons 106 and 116, but any suitable system may be used to shift or translate the connecting rod 120. In other examples, the connecting rod 120 may be omitted, and any suitable system may be used to position the warming piston 106 and the cryo piston 116. For example, each piston may have its own linear actuator. In other cases, each piston may have its own connecting rod, and the connecting rods may be actuated by respective surfaces of a crank shaft. Any currently available, or after developed, system may be used to position the warming piston 106 and the cryo piston 116.

The warming-active volume 108 is fluidly coupled to the cryo-active volume 118. In the example of FIG. 1A, the fluidic connection is show by way of tube 124. Disposed within the combined warming-active volume 108 and cryo-active volume 118 is a working fluid 126. In some cases the working fluid 126 is helium. In the example orientation shown in FIG. 1, the warming-active volume 108 is greater than the cryo-active volume 118, and thus a majority of the working fluid 126 resides in the warming-active volume 108.

FIG. 1B shows a cross-sectional schematic view of the example piston pair 100. In FIG. 1B, the connecting rod 120 connects on the inside surfaces of the warming piston 106 and the cryo piston 116, and thus the connecting rod 120 extends through the warming-active volume 108 and the cryo-active volume 118. Seals around the connecting rod 120 of FIG. 1B retain the working fluid 126 within the system as the warming piston 106, the connecting rod 120, and the cryo piston 116 are moved. In the example system, the linear actuator 122 is couple to the connecting rod 120 by way of the warming piston 106, but nevertheless the linear actuator 122 may positon the warming piston 106 and cryo piston 116.

Figure 2:
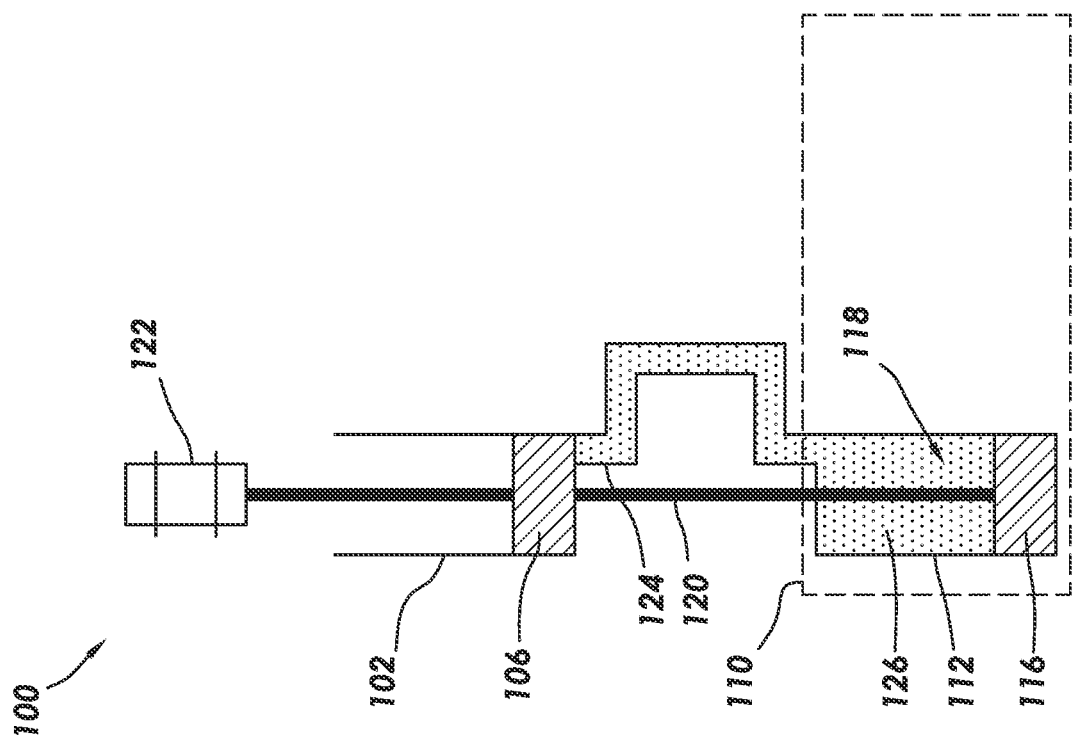
FIG. 2 shows a cross-sectional schematic view of a piston pair in a first configuration, in accordance with at least some embodiments.

FIG. 2 shows a cross-sectional schematic view of the piston pair 100 in a first configuration. In particular, in FIG. 2, the example linear actuator 122 has positioned the warming piston 106 such that the warming-active volume 108 is at or near its largest volume. Moreover, in positioning the warming piston 106, the linear actuator 122 has positioned the connecting rod 120 and the cyro piston 116 such that the cryo-active volume 118 is at or near its smallest volume. Thus, the majority of the working fluid 126 of the piston pair 100 resides in the warming-active volume 108, and little or no working fluid 126 resides in the cryo-active volume 118 (not visible in FIG. 2).

Consider, for purposes of discussion, that the combined volume of the warming-active volume 108, the cryo-active volume 118, and the tube 124 is 1000 Liters (L). Larger and smaller combined volumes may be used, but 1000 L is selected to make the example mathematics easier to follow. Further consider that the example partial system has been in the configuration of FIG. 2 for a sufficient period of time to bring the working fluid 126 to atmospheric temperature. For purposes of discussion, atmospheric temperature will be assumed be about 300° K. Of course, atmospheric temperature varies across the surface of the globe, but even considering the variation across the globe, atmospheric temperatures are still well above cryogenic temperatures as defined herein. Further consider that the amount of working fluid 126 in the example partial system has a pressure of 300 atmospheres (Atm) when the working fluid reaches atmospheric temperature of about 300° K. Thus, in the configuration and under the assumptions of FIG. 2, the working fluid has a pressure of about 300 Atm and a temperature of about 300° K.

Now consider that the example linear actuator 122 moves the warming piston 106, the connecting rod 120, and the cryo piston 116 such that the working fluid 126 is moved from the warming-active volume 108 to the cryo-active volume 118 through the tube 124. Further consider that, as the working fluid moves through the tube 124, heat energy in the working fluid 126 is extracted or exchanged with another working fluid (not shown in FIG. 2) at cryogenic temperature. The extraction or exchange of heat energy is illustrated by the arrows 200, and discussed in greater detail below. Further still, consider that the extraction or exchange of heat energy associated with the tube 124 is very efficient, but not 100% efficient. The specification assumes an efficiency of about 99% in the extraction or exchange of heat energy from the working fluid 126, but lesser and greater efficiencies are possible. Thus, as the working fluid 126 moves from the warming-active volume 108 to the cryo-active volume 118, the working fluid 126 is cooled. Moreover, the combined volume of the warming-active volume 108, the cryo-active volume 118, and the tube 124 in this example is fixed, even as the pistons move. Given the fixed combined volume, the reduction in temperature of the working fluid 126 results in lower pressure as well.

Figure 3:
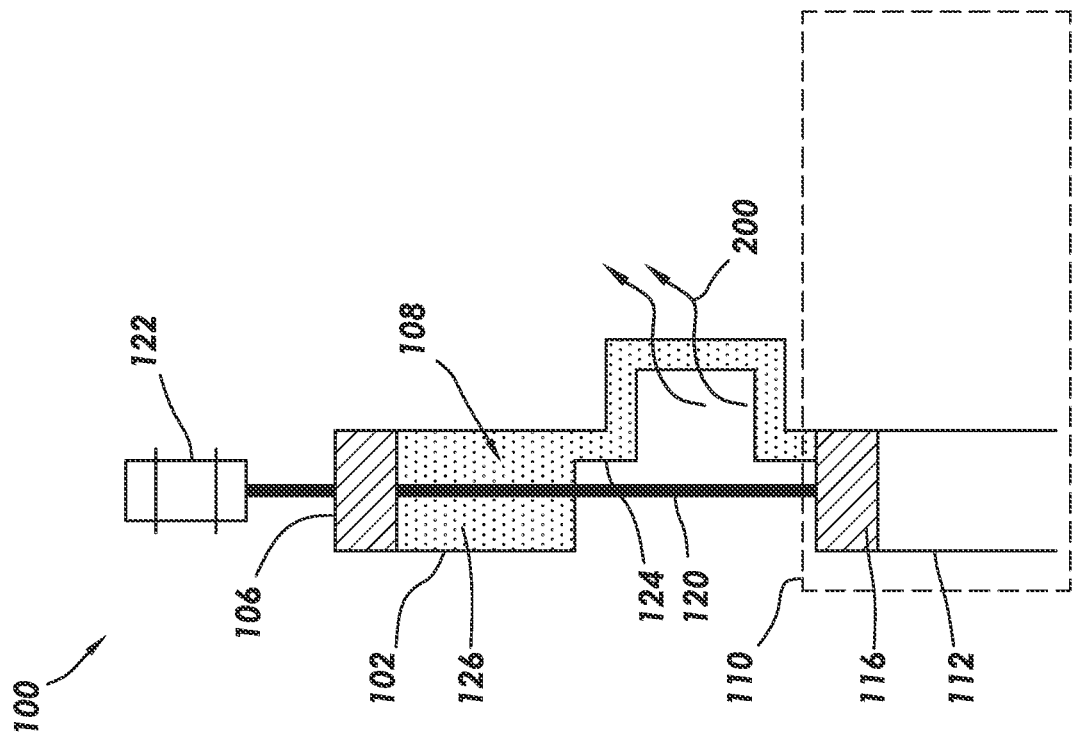
FIG. 3 shows a cross-sectional schematic view of the piston pair in a second configuration, in accordance with at least some embodiments.

FIG. 3 shows a cross-sectional schematic view of the piston pair 100 in a second configuration. In particular, in FIG. 3 the example linear actuator 122 has positioned the warming piston 106, the connecting rod 120, and the cryo piston 116 such that the warming-active volume is at or near its smallest volume. Oppositely, the cryo-active volume 118 is at or near its largest volume. Thus, the majority of the working fluid 126 of the piston pair 100 resides in the cryo-active volume 118, and little or no working fluid 126 resides in the warming-active volume 108 (not visible in FIG. 3).

In the second configuration as shown in FIG. 3, the pressure of the working fluid 126, residing mostly within cryo-active volume 118, is about 1 Atm. The temperature of the working fluid 126 will be a cryogenic temperature, in some cases about 1° K. Other cryogenic temperatures for the working fluid 126 may be implemented. In an ideal system having 100% efficiency extracting heat energy from the working fluid 126 during the transition from the configuration of FIG. 2 to the configuration of FIG. 3, no excess heat energy finds its way to the cryogenic region 110. However, no system is perfectly efficient, and thus the working fluid 126 may be somewhat above the ultimate cryogenic temperature when the movement of working fluid 126 between the warming-active volume 108 and the cryo-active volume 118 is complete. The working fluid 126 may be cooled to the ultimate cryogenic temperature by virtue of the cryo cylinder 112 being exposed to cryogenic temperature. In example systems, and as discussed more below, the heat energy that finds its way to the cryogenic region 110 may be removed in any suitable form, such as by a heat pump system arranged to maintain a setpoint cryogenic temperature within the cryogenic region 110.

In example systems, a complete cycle of the piston pair 100 involves the linear actuator 122 moving the warming piston 106, the connecting rod 120, and the cryo piston 116 from the configuration of FIG. 2 to the configuration of FIG. 3, and then back to the configuration shown in FIG. 2. Though the following is not displayed through a new figure so as not to unduly lengthen the specification, as the working fluid 126 moves from the shrinking cryo-active volume 118 to the expanding warming-active volume 108, heat energy is again exchanged with another working fluid. In this case of the working fluid 126 moving into the warming-active volume 108, the working fluid 126 absorbs the heat energy. In the final position in the transition from the configuration shown in FIG. 3 back to the configuration shown in FIG. 2, the temperature of the working fluid 126 is again increased, and so too is the pressure. In an ideal system having 100% efficiency in the absorption of heat energy into the working fluid 126, the working fluid 126 returns to a pressure of 300 Atm and atmospheric temperature. However again, no system is perfectly efficient, and thus the working fluid 126 may be somewhat below atmospheric temperature when the movement of working fluid 126 between the cryo-active volume 118 and the warming-active volume 108 is complete. The working fluid 126 may be warmed to atmospheric temperature of about 300° K by virtue of the warming cylinder 102 being exposed to atmospheric temperature. That is, solar energy collected by the atmosphere is used to warm the working fluid 126 in the warming cylinder 102. When the working fluid again reaches atmospheric temperature of about 300° K, the pressure of the working fluid in the example system will be about 300 Atm.

The example piston pair 100 is introduced to orient the reader to the interactions of temperature and pressure of the working fluid 126 within a piston pair 100. The discussion alludes to the working fluid 126 exchanging or given up heat energy when being transferred from the warming-active volume 108 to the cryo-active volume 118. The discussion also alludes to the working fluid 126 absorbing heat energy when being transferred from the cryo-active volume 118 to the warming-active volume 108. In example systems, the alluded to exchange of heat energy occurs with a second working fluid associated with a second piston pair.

Figure 4:
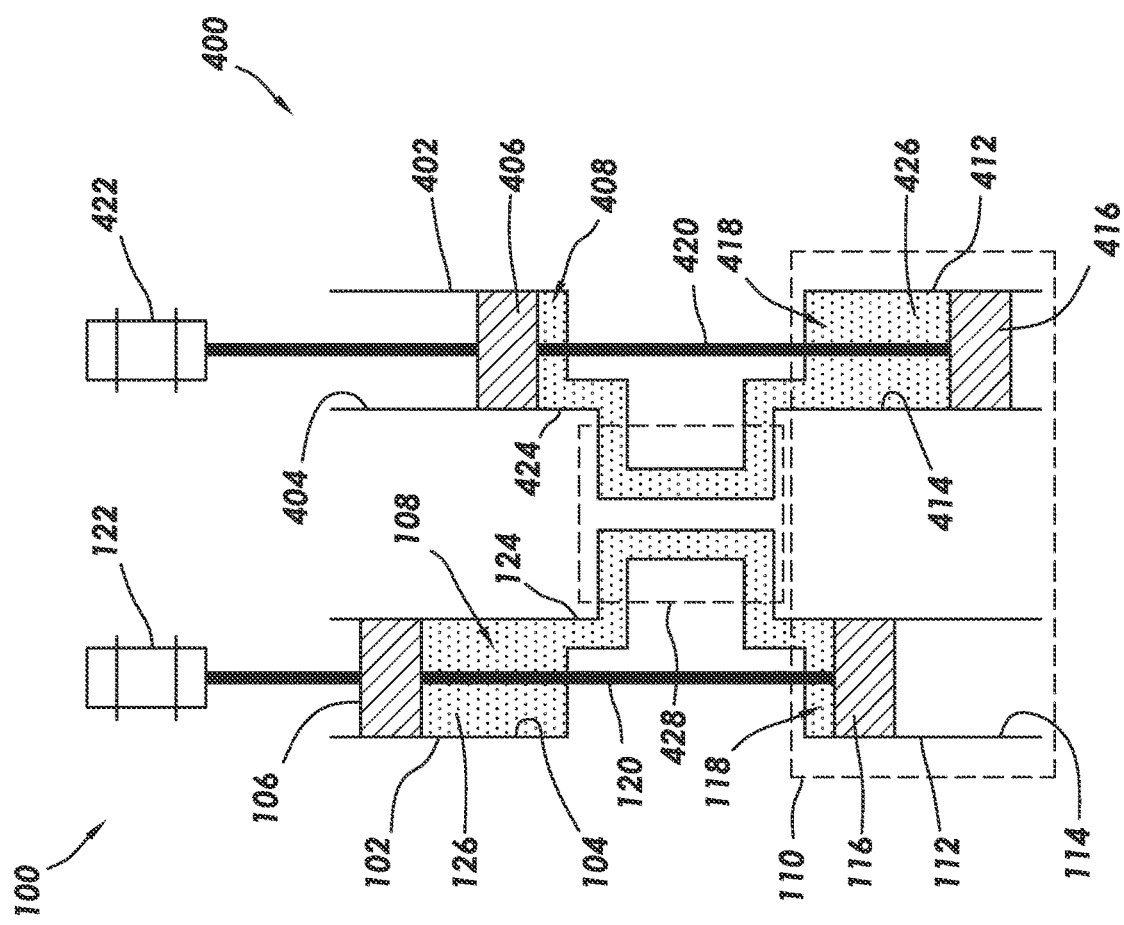
FIG. 4 shows a cross-sectional schematic view of a partial system having two piston pairs, in accordance with at least some embodiments.

FIG. 4 shows a cross-sectional schematic view of a partial system having two example piston pairs. In particular, FIG. 4 shows the first piston pair 100, along with a second piston pair 400. The piston pair 400 comprises a warming cylinder 402, shown in cross-section. The warming cylinder 402 in various examples is constructed of a metallic material and the exterior of the warming cylinder 402 is exposed to atmospheric temperature and pressure. The warming cylinder 402 defines a cylinder bore 404 having a warming piston 406 disposed therein. The combination of the cylinder bore 404 within the warming cylinder 402 and the warming piston 406 define a warming-active volume 408. The volume defined by the warming-active volume 408 is variable depending on the position of the warming piston 406 within the warming cylinder 402.

The example piston pair 400 further includes a cryo cylinder 412, also shown in cross-section. The cryo cylinder 412 in various examples is constructed of a metallic material. The cryo cylinder 412 defines cylinder bore 414 having a cryo piston 416 disposed therein. The combination of the cylinder bore 414 within the cryo cylinder 412 and the cryo piston 416 define a cryo-active volume 418. The volume defined by the cryo-active volume 418 is variable depending on the position of the cryo piston 416 within the cryo cylinder 412. The cryo cylinder 412 is disposed within the region of cryogenic temperatures, illustrated as the cryogenic region 110. The exterior surface of the cryo cylinder 412 is exposed to cryogenic temperatures, and the metallic material of the cryo cylinder 412 is thermally isolated from the metallic material of the warming cylinder 402.

In the example system, the warming piston 406 and the cryo piston 416 are coupled together by a connecting rod 420. In particular, the connecting rod 420 defines first end coupled to the warming piston 406. The connecting rod 420 defines a second end coupled to the cryo piston 416. In this example system, the connecting rod 420 fixes the physical relationship of the warming piston 406 and the cryo piston 416. The position of the warming piston 406, the connecting rod 420, and the cryo piston 416 may be shifted, the shifting in any suitable form. FIG. 4 illustratively shows a linear actuator 422 coupled to the warming piston 406 and thus the connecting rod 420 and cyro piston 416 to enable the movement of the pistons 406 and 416, but any suitable system may be used to shift or translate the connecting rod 420 and thus the piston 406 and 416. In other examples, the connecting rod 420 may be omitted, and any suitable system may be used to position the warming piston 406 and the cryo piston 416. For example, each piston may have its own linear actuator. In other cases, each piston may be associated with its own connecting rod, and the connecting rods may be actuated by respective surfaces of a crank shaft. Movement may be coordinated with movement action of the cylinders in the piston pair 100. Any currently available, or after developed, system may be used to position the warming piston 406 and the cryo piston 416. These positioning system(s) need not be the same as those system(s) used to position the warming piston 106 and the cryo piston 116.

The warming-active volume 408 defined by the warming cylinder 402 and warming piston 406 is fluidly coupled to the cryo-active volume 418 defined by the cryo cylinder 412 and the cryo piston 416. In the example of FIG. 4, the fluidic connection is by way of a tube 424. In example systems, the tube 424 is a flow path through a counter-flow heat exchanger 428. Likewise, the tube 124 associated with the piston pair 100 is the complementary flow path through the counter-flow heat exchanger 428. Thus, the warming-active volume 408 and cryo-active volume 418 are fluidly coupled together. Disposed within the combined warming-active volume 408 and cryo-active volume 418 is a working fluid 426. In some cases the working fluid 426 is helium. In the example orientation shown in FIG. 4, cryo-active volume 418 is greater than the warming-active volume 408, and thus a majority of the working fluid 426 resides in in the warming-active volume 408.

Figure 5:
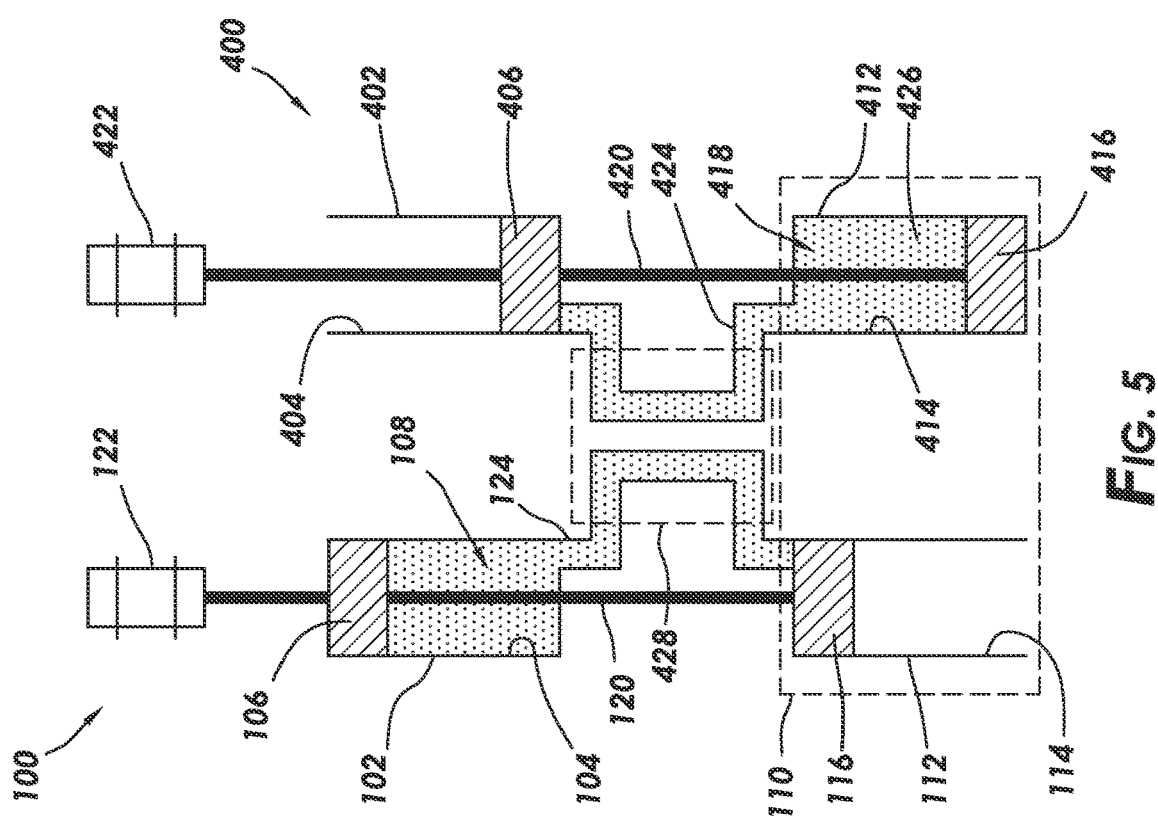
FIG. 5 shows a cross-sectional schematic view of the first piston pair in the first configuration and the second piston pair in the second configuration, in accordance with at least some embodiments.

FIG. 5 shows a cross-sectional schematic view of the piston pair 100 in the first configuration and the piston pair 400 in the second configuration. In particular, in FIG. 5 the example linear actuator 122 has positioned the warming piston 106, the connecting rod 120, and the cryo piston 116 such that the warming-active volume 108 is at or near its largest volume, and the cryo-active volume 118 is at or near its smallest volume. Thus, the majority of the working fluid 126 of the piston pair 100 resides in the warming-active volume 108, and little or no working fluid 126 resides in the cryo-active volume 118 (not visible in FIG. 5). Further in FIG. 5, the example linear actuator 422 has positioned the warming piston 416, the connecting rod 420, and the cryo piston 416 such that the cryo-active volume 418 is at or near its largest volume, and the warming-active volume 408 is at or near its smallest volume. Thus, the majority of the working fluid 426 of the piston pair 400 resides in the cryo-active volume 418, and little or no working fluid 426 resides in the warming-active volume 408 (not visible in FIG. 5).

In this example system, the combined volume of the warming-active volume 408, the cryo-active volume 418, and the tube 424 is fixed regardless of the position of the connecting rod 420. Moreover, in the example the combined volume is the same or larger than the corresponding volume of the piston pair 100. For this example then, the combined volume of the warming-active volume 408, the cryo-active volume 418, and the tube 424 is about 1000 L or greater. Further consider that the example partial system has been in the configuration of FIG. 5 for a sufficient period of time to bring the working fluid 126 to atmospheric temperature of about 300° K and that the working fluid 426 has reached a cryogenic temperature of about 1° K. Further consider that the amount of working fluid 426 in the piston pair 400 has a pressure of about 1 Atm when the working fluid reaches the cryogenic temperature of about 1° K.

Now consider that the example linear actuator 122 translates the connecting rod 120 such that the working fluid 126 is moved from the warming-active volume 108 to the cryo-active volume 118 through the tube 124 of the counter-flow heat exchanger 428. Further consider that, simultaneously, the example linear actuator 422 translates the connecting rod 420 such that the working fluid 426 is moved from the cryo-active volume 418 to the warming-active volume 408 through the tube 424 of the counter-flow heat exchanger 428. As the working fluids move, heat energy in the working fluid 126 is transferred to the working fluid 426. Thus, as the working fluid 126 moves from the warming-active volume 108 to the cryo-active volume 118, the working fluid 126 is cooled. Given that the combined volume of the warming-active volume 108, the cryo-active volume 118, and the tube 124 is fixed in this example, even as the pistons move, the reduction in temperature of the working fluid 126 results in lower pressure as well. Moreover, as the working fluid 426 moves from the cryo-active volume 418 to the warming-active volume 408, the working fluid 426 is warmed. Relatedly, given that the combined volume of the warming-active volume 408, the cryo-active volume 418, and the tube 424 is fixed in this example, even as the pistons move, the increase in temperature of the working fluid 426 results in higher pressure.

Figure 6:
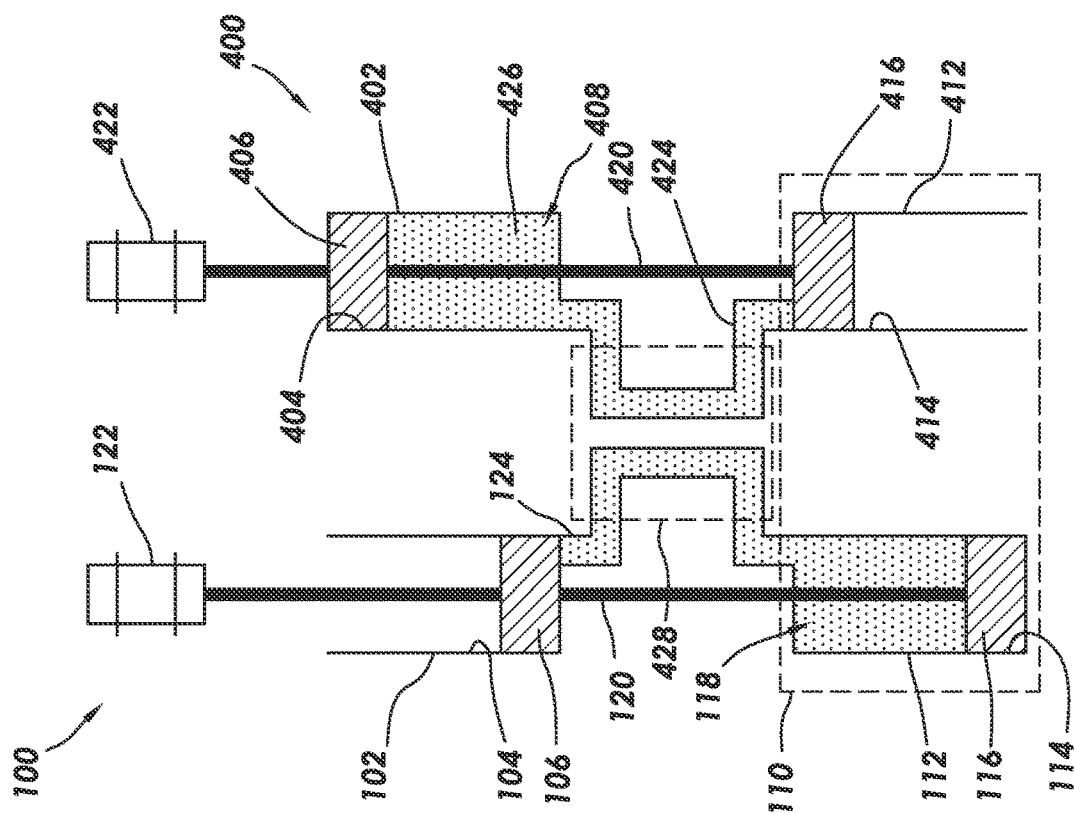
FIG. 6 shows a cross-sectional schematic view of the first piston pair in the second configuration and the second piston pair in the first configuration, in accordance with at least some embodiments.

FIG. 6 shows a cross-sectional schematic view of the piston pair 100 in the second configuration and the piston pair 400 in the first configuration. In particular, in FIG. 6 the example linear actuator 122 has positioned the warming piston 108, the connecting rod 120, and the cryo piston 116 such that the warming-active volume 108 is at or near its smallest volume, and the cryo-active volume 118 is at or near its largest volume. Thus, the majority of the working fluid 126 of the piston pair 100 resides in the cryo-active volume 118, and little or no working fluid 126 resides in the warming-active volume 108 (not visible in FIG. 6). Further in FIG. 6, the example linear actuator 422 has positioned the warming piston 406, the connecting rod 420, and the cryo piston 416 such that the cryo-active volume 418 is at or near its smallest volume, and the warming-active volume 408 is at or near its largest volume. Thus, the majority of the working fluid 426 of the piston pair 400 resides in the warming-active volume 408, and little or no working fluid 426 resides in the cryo-active volume 418 (not visible in FIG. 6).

In the configurations displayed in FIG. 6, the pressure of the working fluid 126, residing mostly within cryo-active volume 118, will be a cryogenic temperature, in some cases about 1° K. The pressure of the working fluid 126 will be about 1 Atm. Further in the configurations of FIG. 6, the pressure of the working fluid 426, residing mostly within warming-active volume 408, will be about 300 Atm. The temperature of the working fluid 426 will be atmospheric temperature of about 300° K. In an ideal system having 100% efficiency in the exchange of heat between the working fluid 126 and the working fluid 426 through the counter-flow heat exchanger 428, no excess heat energy finds its way to the cryogenic region 110 and the temperature of the working fluid 426 will closely match atmospheric temperature. However, no system is perfectly efficient, and thus the working fluid 126 may be somewhat above the ultimate cryogenic temperature when the movement of working fluid 126 between the warming-active volume 108 and the cryo-active volume 118 is complete. As before, the working fluid 126 may be cooled the ultimate cryogenic temperature by virtue of the cryo cylinder 112 being exposed to cryogenic temperature. Likewise, the working fluid 426 may be somewhat below atmospheric temperature when the movement of the working fluid 426 between the cryo-active volume 418 and the warming-active volume 408 is complete. As before, the working fluid 426 may be warmed to atmospheric temperature by virtue of the warming cylinder 402 being exposed to atmospheric temperature.

In example systems, a complete cycle involves moving from the configuration of FIG. 5 to the configuration of FIG. 6, and then moving from the configuration of FIG. 6 to the configuration of FIG. 5. Though the following is not displayed through a new figure so as not to unduly lengthen the specification, in the transition from the configuration of FIG. 6 to the configuration of FIG. 5, heat energy in the working fluid 126 is provided to the working fluid 426 by way of the counter-flow heat exchanger 428.

A finite amount of energy is used to operate the system. That is, the example linear actuators 122 and 422 use energy to move the respective pistons and connecting rods. However, the energy used to move the pistons and connecting rods is only that to overcome the force of friction within the cylinders, the resistance to flow of the respective working fluids, and the force of gravity. Moreover, a finite amount of energy is used to keep the cryogenic region 110 at the cryogenic temperature. That is, the energy used to maintain the cryogenic region 110 at the cryogenic temperature is merely that used to displace heat energy that finds its way into the cryogenic region based on the inefficiencies of the counter-flow heat exchanger 428 and to overcome shortcomings in insulation of the cryogenic region 110. As will be discussed more below, the energy used to move the pistons and connecting rods, and to maintain the cryogenic region 110, is relatively small compared to the amount of energy that can be extracted from atmospheric air when the atmosphere acts as a solar energy collector.

Figure 7:
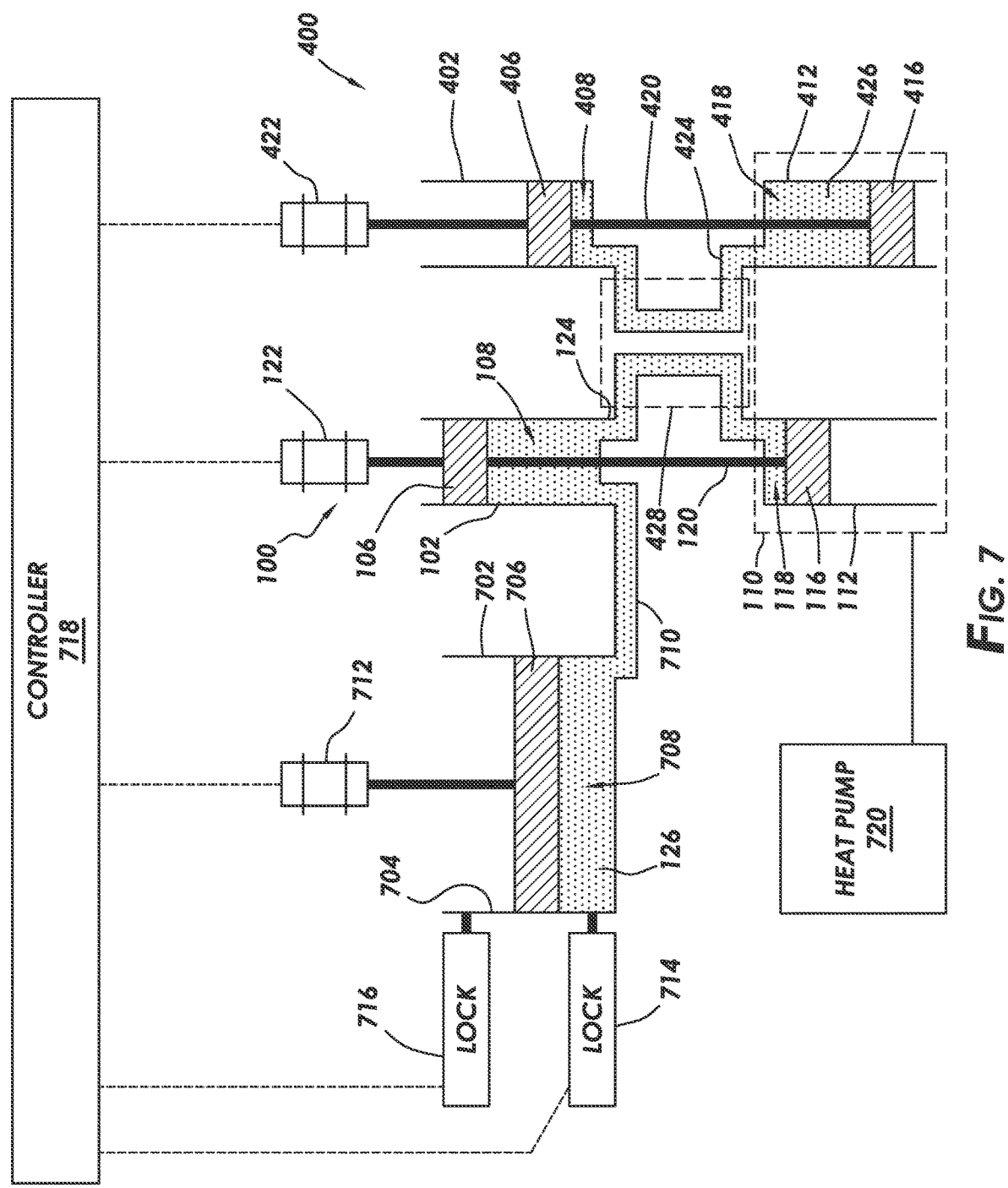
FIG. 7 shows a cross-sectional schematic view of a system for atmospheric energy recovery, in accordance with at least some embodiments.

FIG. 7 shows a cross-sectional schematic view of an example system for atmospheric energy recovery. In particular, FIG. 7 shows the piston pair 100 and the piston pair 400 as previously described. Further, the example system includes a working cylinder 702, shown in cross-section. The working cylinder 702 in various examples is constructed of a metallic material, and the exterior of the working cylinder 702 is exposed to atmospheric temperature and pressure. In particular, the working cylinder 702 is designed and constructed to enable rapid heat exchange with atmospheric air. In some cases, the atmospheric airflow by and around the working cylinder 702 may be passive airflow, and in other cases the airflow may be forced as appropriate for the application. The working cylinder 702 defines cylinder bore 704 having a working piston 706 disposed therein. The combination of the cylinder bore 704 within the working cylinder 702 and the working piston 706 define a working-active volume 708. The volume defined by the working-active volume 708 is variable depending on the position of the working piston 706 within the working cylinder 702. When the working piston 706 is in a position to define the largest working-active volume 708, the largest working-active volume 708 is larger than the volume of the piston pair 100 (e.g., the combined warming-active volume 108 and cryo-active volume 118). In one example, and to make the mathematics easier to follow, the largest working-active volume 708 is 300 times larger than the volume of the piston pair 100. Thus, if the combined warming-active volume 108 and cryo-active volume 118 is about 3.3 L, then the largest working-active volume 708 may be about 996.6 L, which results in a total volume of about 1000 L. Larger and smaller volumes are possible—these values are selected to make the mathematics easier to follow.

The working-active volume 708 is fluidly coupled to the warming-active volume 108 and the cryo-active volume 118. In the example of FIG. 7, the fluidic connection is shown by way of tube 710. However, the fluidic connection may take any suitable form. For example, given that the working cylinder 702 and the warming cylinder 102 are both constructed of metallic material, and are both exposed to atmospheric temperature and pressure, the fluidic connection may be implemented as an aperture through a shared side wall.

Disposed within the combined working-active volume 708, warming-active volume 108, and cryo-active volume 118 is the working fluid 126. As before, in some cases the working fluid 126 is helium. In example systems, the amount of working fluid 126, at standard temperature and pressure, in the combined working-active volume 708, warming-active volume 108, and cryo-active volume 118 is the equal to the amount held in the piston pair 100 in the discussion of FIGS. 1A, 1B, and 2-6. Stated otherwise, the mass of working fluid 126 within the combined working-active volume 708, warming-active volume 108, and cryo-active volume 118 is the same mass that is assumed to reside in the combined warming-active volume 108 and cryo-active volume 118 in the discussion of FIGS. 1A, 1B, and 2-6.

The example working piston 706 is coupled work extraction device, illustratively shown as an electrical generator 712. The electrical generator 712 may take any suitable form, such as an electric motor, in some cases a linear electric motor. However, any currently available or after developed system for extracting energy from movement of the working piston 706 may be used. The example electrical generator 712 may convert movement of the working piston 706 into electrical energy that may be used for any suitable purpose, such as powering a home, powering a city, propelling a vehicle, and/or extracting carbon from the atmosphere to reduce global warming, to name a few. A small portion of the electrical energy may be used to power the devices of the system itself.

Still referring to FIG. 7, the example system further comprises two locks designed and constructed to hold the working piston 706 in various configurations. In particular, the example system comprises a down lock 714. The down lock 714 is designed and constructed to hold the working piston 706 such that the working-active volume 708 is fixed at a relatively small volume. In some cases, the down lock 714 is designed and constructed to hold the working piston 706 such that the working-active volume 708 is at its smallest volume. The example system further comprises an up lock 716. The up lock 716 is designed and constructed to hold the working piston 706 such that the working-active volume 708 is fixed at a relatively large volume. In some cases, the up lock 716 is designed and constructed to hold the working piston 706 such that the working-active volume 708 is at its largest volume. The down lock 714 and up lock 716 are conceptual locks presented for purposes of explaining operation of the system. More practical locks are discussed in greater detail below.

Considering the combined volumes, the up lock 716 is designed and constructed to hold the working piston 706 such that the combined working-active volume 708, warming-active volume 108, and cryo-active volume 118 is fixed and is larger than when the working piston 706 is held by the down lock 714. The down lock 714 is designed and constructed to hold the working piston 706 such that working-active volume 708 is fixed, and such that the combined working-active volume 708, warming-active volume 108, and cryo-active volume 118 is smaller than when the working piston 706 is held by the up lock 716.

The example system further includes a controller 718, shown in block diagram form. The example controller is communicatively coupled to the electrical generator 712, as shown by the dashed line. Thus, the controller 718 may be designed and constructed to control operation of the electrical generator 712, such as to convert movement of the working piston 706 into electrical energy. The example controller 718 is also communicatively coupled to the up lock 716 and the down lock 714, as shown by the dashed lines. Thus, the controller 718 may be designed and constructed actuate the locks 714 and 716 to hold the working piston 706 in various configurations, discussed more below. Finally, the controller 718 may be communicatively coupled to the linear actuator 122 and the linear actuator 422, as shown by the dashed lines. Thus, the controller 718 may be designed and constructed to position the pistons and connecting rods to implement the atmospheric solar energy recovery.

Still referring to FIG. 7, the example system further shows, in block diagram form, a heat pump 720 operationally coupled to the cryogenic region 110. The example heat pump 720 is designed and constructed to cool the cryogenic region 110 to cryogenic temperature prior to operation of the system. Moreover, the heat pump 720 removes excess heat energy that finds its way to the cryogenic region because of inefficiencies in counter-flow heat exchanger 428. Any suitable heat pump 720, including any suitable cooled fluid within the cryogenic region 110, may be used.

The specification now turns to a series of figures to explain operation of the overall system for atmospheric solar energy recovery, including the operation and interactions of the working cylinder 702, the piston pair 100, and the piston pair 400. In the figures that follow, the controller 718 and its communicative connections, as well as the heat pump 720, are omitted. However, the omission is merely to reduce the complexity of the figures so as not to obscure the operational understanding.

Figure 8:
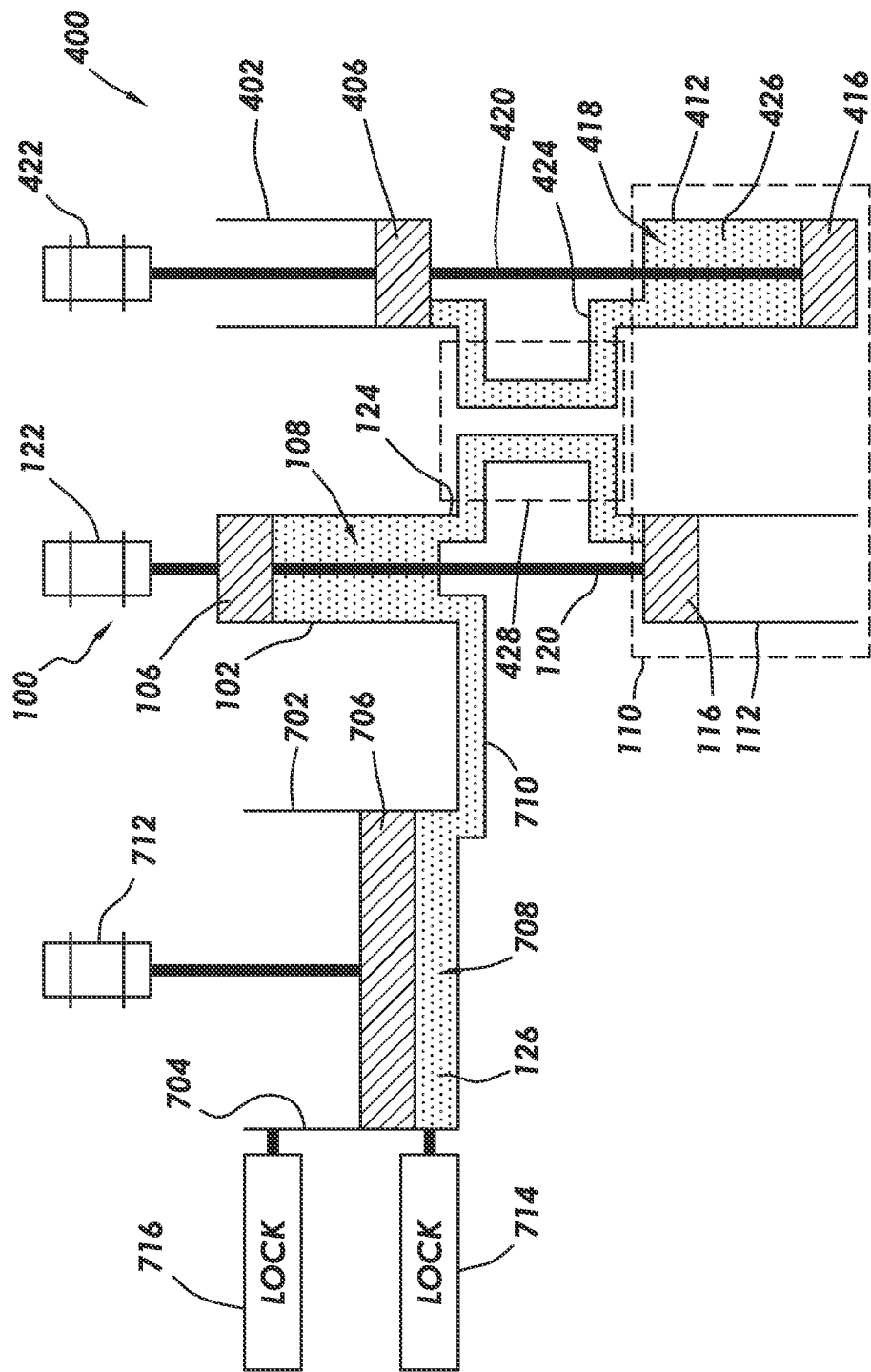
FIG. 8 shows a partial, cross-sectional, schematic view of the system in a first arrangement, in accordance with at least some embodiments.

FIG. 8 shows a partial, cross-sectional, schematic of the system in a first arrangement. In particular, the piston pair 100 and the piston pair 400 are in the configurations shown in FIG. 5. The working piston 706 is in an intermediate position. Neither the up lock 716 nor the down lock 714 are operational or engaged. In the arrangement of FIG. 8, the working fluid 126 is disposed in the working-active volume 708 and the warming-active volume 108, and negligible amounts of the working fluid 126 reside in the tube 710, the tube 124, and the cryo-active volume 418 (not shown in FIG. 8). Consider that the working fluid 126 has a pressure of 1 Atm and a temperature of about 30° K. Moreover, the working fluid 426 in the piston pair 400 largely resides within the cryo cylinder 412, and has a pressure of about 1 Atm and a temperature of about 1° K. The process of how the system arrives in the conditions of FIG. 8 is discussed in greater detail below.

In accordance with various examples, the controller 718 is designed and constructed to maintain the position of the piston pair 100 and the piston pair 400 while the working fluid 126 is warmed by atmospheric air. That is, solar energy absorbed in the atmosphere manifests itself as heat energy. The example system warms the working fluid 126 from the heat energy in the atmospheric air. As the working fluid 126 warms, its volume increases. The increasing volume of the working fluid 126 thus moves the working piston 706. Stated slightly differently, the working fluid 126 is warmed by atmospheric air, and experiences a near-constant-pressure volume expansion caused by the increasing temperature. The electrical generator 712 is not active during the warming and volume of the working fluid 126.

Figure 9:
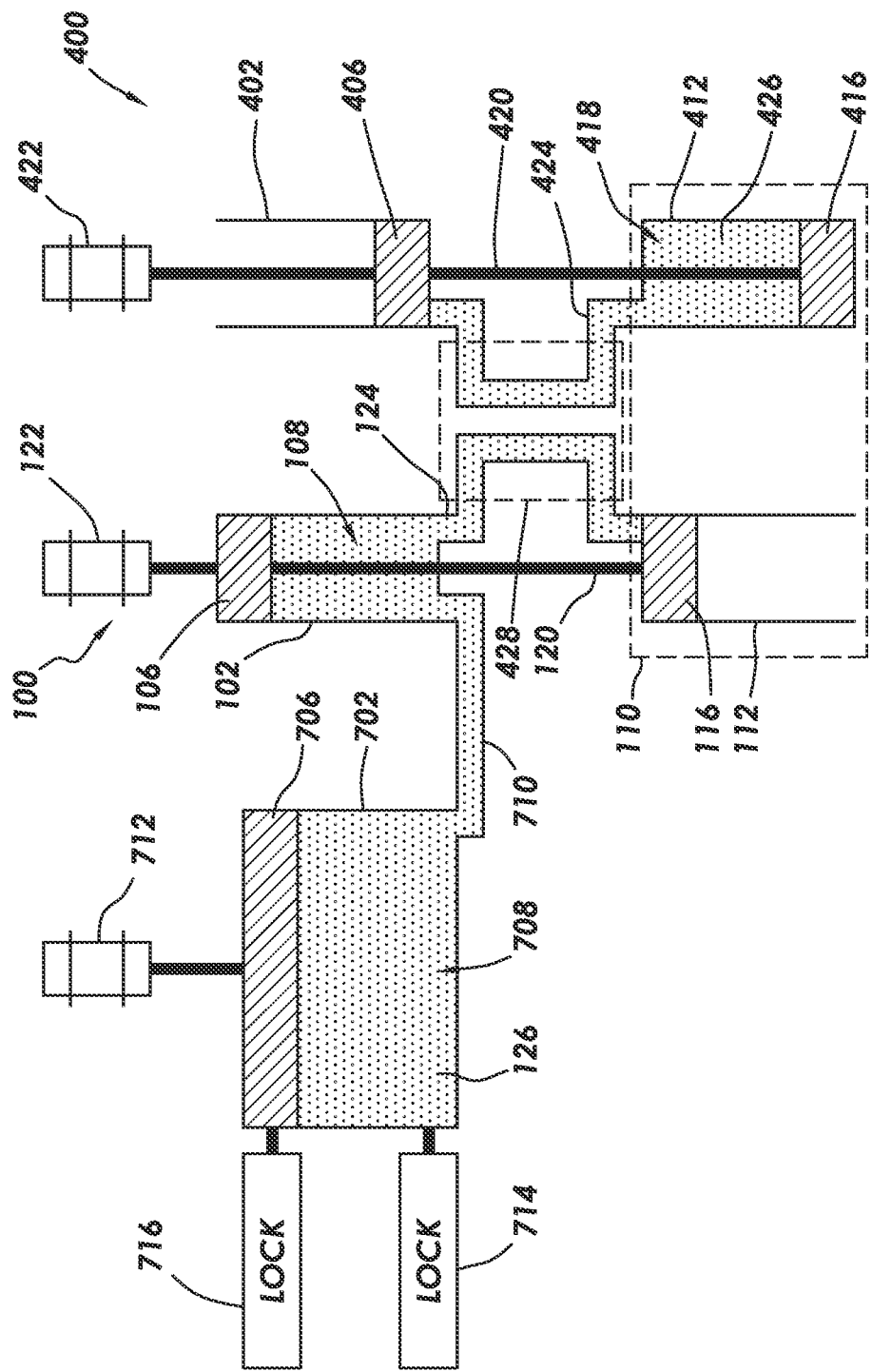
FIG. 9 shows a partial, cross-sectional, schematic view of the system after the example volume expansion of a first working fluid associated with the first piston pair, and in accordance with at least some embodiments.

FIG. 9 shows the partial, cross-sectional, schematic of the system after the example volume expansion of the working fluid 126. In particular, the piston pair 100 and the piston pair 400 are still in the immediately prior configuration of FIG. 8. Because of the volume expansion of the working fluid 126 caused by warming from atmospheric air, the working piston 706 has reached a position defining the largest working-active volume 708. In the arrangement shown in FIG. 9, the pressure of the working fluid 126 is still 1 Atm when the working fluid reaches 300° K. Thus, the example system extracts heat energy from atmospheric air in the transition from the configuration of FIG. 8 to the configuration of FIG. 9.

Once the working piston 706 reaches the configuration of the FIG. 9, in which the working-active volume 708 is at its largest volume, the controller 718 (FIG. 7) actuates the up lock 716 to hold working piston 706 in place. The next step in the example process is exchanging heat in the working fluid 126 of the first piston pair 100 with the working fluid 426 of the second piston pair 400 while the working piston 706 is locked by up lock 716 in the up arrangement.

Figure 10:
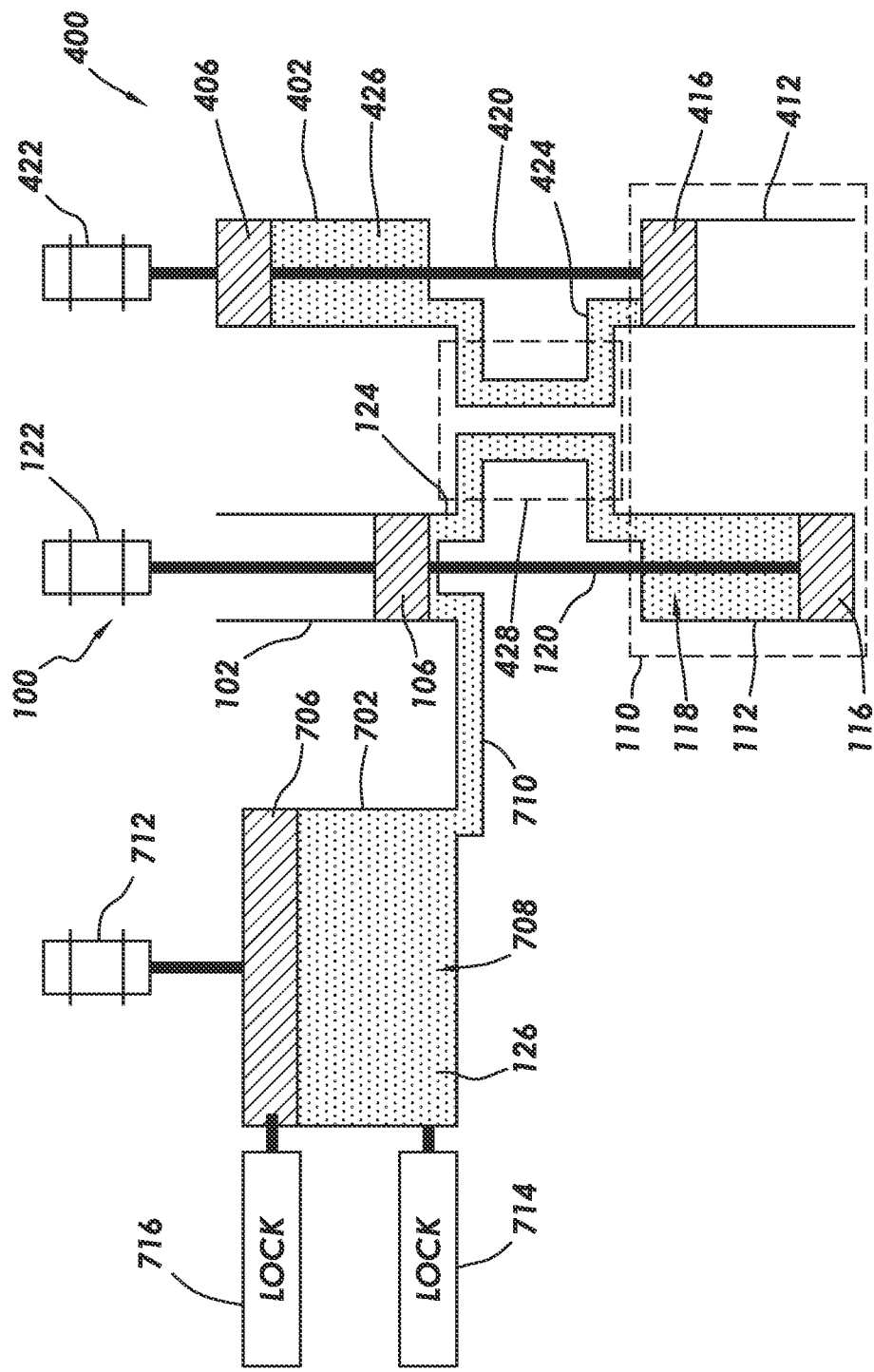
FIG. 10 shows a partial, cross-sectional, schematic view of the system after an example exchange of heat energy between the first working fluid of the first piston pair with the second working fluid of the second piston pair, and in accordance with at least some embodiments.

FIG. 10 shows the partial, cross-sectional, schematic of the system after the exchange of heat energy between the working fluid 126 of the piston pair 100 with the working fluid 426 of the piston pair 400. In particular, the controller 718 is designed and constructed to hold the working piston 706 in place, such as by up lock 716. The controller 718 is further designed and constructed to move the warming piston 106 and the cryo piston 116 such that the working fluid 126 moves through first flow path of the counter-flow heat exchanger 428. Likewise, the controller 718 is designed and constructed to move the warming piston 406 and the cryo piston 416 such that the working fluid 426 moves through the second flow path of the counter-flow heat exchanger 428. The result of the movement of the piston pairs 100 and 400 is the exchange of heat energy between the working fluid 126 and the working fluid 426. The working fluid 126 is cooled in the exchange and thus loses pressure, and the working fluid 426 is warmed in the exchange and thus gains pressure.

FIG. 10 shows the position of the piston pair 100 and the piston pair 400 after movement or translation. The piston pair 100 translates downward at the same time as the piston pair 400 translates upward. Though it appears the warming piston 106 and cryo piston 116 can only move a portion of the working fluid 126 into the counter-flow heat exchanger 428 and cryo-active volume 118, the cooling and volume contraction of the working fluid 126 acts to draw the great majority of working fluid 126 through the counter-flow heat exchanger 428. The example working fluid 126, helium, at about 1° K is 300 times denser than helium at 300° K, and thus gravity tends to hold the cooled working fluid 126 within cryo-active volume 118 in the configuration of FIG. 10.

In the ongoing example, when the movement or translation of the piston pairs 100 and 400 is complete, as shown in FIG. 10, and with the relationship of volume of the working-active volume 708 and the volume of the piston pair 100, the working fluid 126 may have a pressure of about 1/300 Atm and a temperature of about 1° K. Thus, the working piston 706, still locked in the configuration shown, experiences a differential pressure as between atmospheric pressure outside the working cylinder 702, and the example 1/300 Atm in the working-active volume 708. Oppositely, within the piston pair 400, the working fluid 426 may have a pressure of about 300 Atm and be at atmospheric temperature of about 300° K.

The next step in the example operation is utilizing the differential pressure across the working piston 706 illustrated by the arrangement of FIG. 10. In particular, the working piston 706 may be released. The differential pressure across the working piston 706 thus causes the working piston 706 to move or translate, which is shown in FIG. 10 as a downward movement. As the working piston 706 moves, the electrical generator 712 converts the movement to electrical energy.

Figure 11:
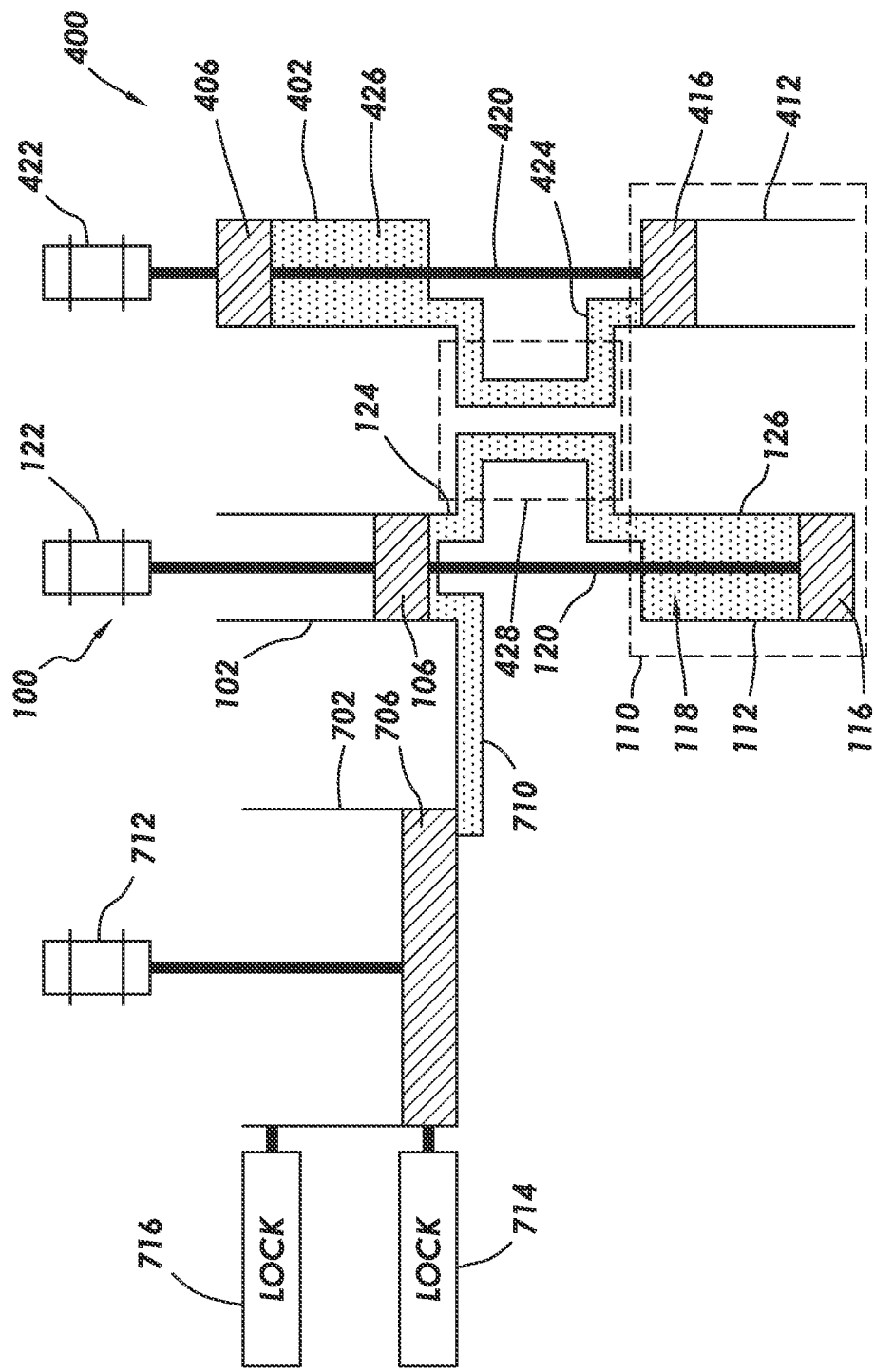
FIG. 11 shows the partial, cross-sectional, schematic view of the system after the movement of the working piston caused the first differential pressure, and in accordance with at least some embodiments.

FIG. 11 shows the partial, cross-sectional, schematic of the system after the movement of the working piston 706 caused the first differential pressure. In particular, the controller 718 is designed and constructed to hold the piston pairs 100 and 400 in the configuration of FIG. 10 and to release the up lock 716, which initiates the immediate movement of the system to the configuration of FIG. 11. Release of the up lock 716, in combination with the differential pressure across the working piston 706, enables movement of the working piston 706. The controller 718 further arranges the electrical generator 712 to convert the movement of the working piston 706 to electrical energy.

In the ongoing example, when the movement or translation of the working piston 706 is complete, as shown in FIG. 11, the working fluid 126 may have a pressure of about 1 Atm and a temperature of about 1° K. Movement of the working piston by the first differential pressure does not affect the piston pair 400, and thus, for this example, the working fluid 426 maintains the pressure of about 300 Atm and temperature of about 300° K. A majority of the energy that may be extracted over an entire cycle may be extracted in the movement of the working piston as between FIG. 10 and FIG. 11.

Once the working piston 706 reaches the configuration of FIG. 11, in which the working-active volume 708 is at or near its smallest volume, the controller 718 actuates the down lock 714 to hold working piston 706 in place in the down position. The next step in the example process is exchanging heat in the working fluid 426 of the piston pair 400 with the working fluid 126 of the piston pair 100.

Figure 12:
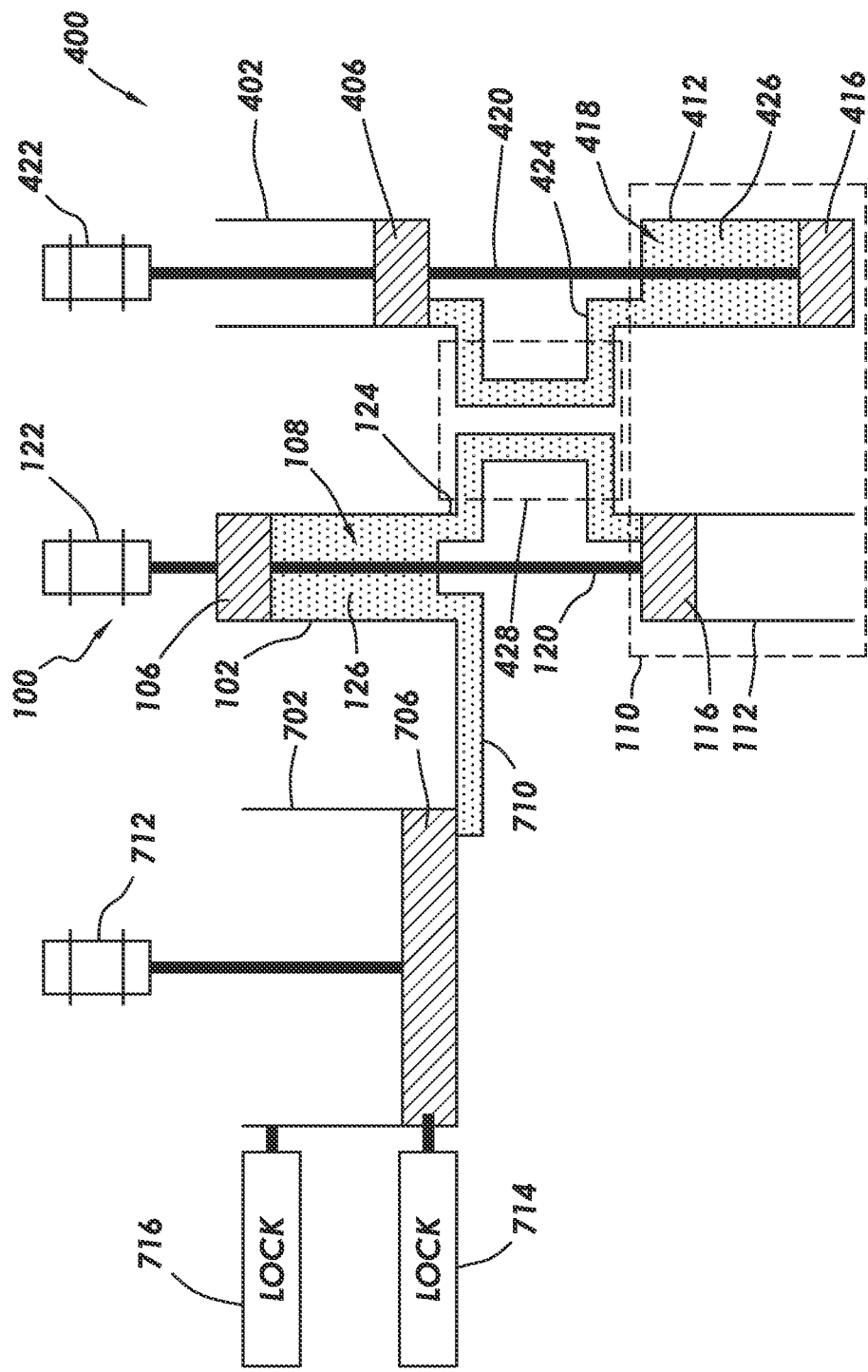
FIG. 12 shows the partial, cross-sectional, schematic view of the system after the exchange of heat energy between the second working fluid in the second piston pair with the first working fluid in the first piston pair, in accordance with at least some embodiments.

FIG. 12 shows the partial, cross-sectional, schematic of the system after the exchange of heat energy between the working fluid 426 of the piston pair 400 with the working fluid 126 of the piston pair 100. In particular, the controller 718 is designed and constructed to hold the working piston 706 in place, such as by down lock 714. The controller 718 is further designed and constructed to move the warming piston 106 and the cryo piston 116 such that the working fluid 126 moves through the first flow path of the counter-flow heat exchanger 428. Likewise, the controller 718 is designed and constructed to move the warming piston 406 and the cryo piston 416 such that the working fluid 426 moves through the second flow path of the counter-flow heat exchanger 428. The result of the movement of the piston pairs 100 and 400 is the exchange of heat energy as between the working fluid 426 and the working fluid 126. The working fluid 126 is warmed in the exchange and thus gains pressure, and the working fluid 426 is cooled in the exchange and thus loses pressure.

FIG. 12 shows the position of the piston pair 100 and the piston pair 400 after movement or translation. The piston pair 100 translates upward at the same time as the piston pair 400 translates downward. In the ongoing example, when the movement or translation of the piston pairs 100 and 400 is complete, as shown in FIG. 12, the working fluid 126 may have a pressure of about 300 Atm and a temperature of about 300° K. Thus, the working piston 706, still locked in the configuration shown, experiences a differential pressure as between atmospheric pressure outside the working cylinder 702 and the example 300 Atm of pressure of the working fluid 126. Oppositely, within the piston pair 400, the working fluid 426 may have a pressure of about 1 Atm and may have a temperature of about 1° K.

The next step in the example operation is utilizing the second differential pressure across the working piston 706 illustrated by the arrangement of FIG. 12. In particular, the working piston 706 may be released. The second differential pressure across the working piston 706 thus causes the working piston 706 to move or translate, which as shown in FIG. 12 as an upward movement. As the working piston 706 moves, the electrical generator 712 converts the movement to electrical energy.

Returning to FIG. 8, the following discussion explains the process of how the system arrives at the conditions and configuration present in in FIG. 8 during the example operation. FIG. 8 shows the partial, cross-sectional, schematic of the system after the movement of the working piston caused the second differential pressure. In particular, the controller 718 is designed and constructed to hold the piston pairs 100 and 400 in the immediately prior configuration (i.e., FIG. 12), and to release the down lock 714. Release of the down lock 714, in combination with the second differential pressure across the working piston 706, enables movement of the working piston 706. The controller 718 further arranges the electrical generator 712 to convert the movement of the working piston 706 to electrical energy.

When the movement or translation of the working piston 706 is complete, as shown in FIG. 8, the working fluid 126 may have a pressure of 1 Atm and a temperature of about 30° K based on the example conditions. Movement of the working piston by the second differential pressure does not affect the piston pair 400, and thus, for this example, the working fluid 426 maintains the pressure of about 300 Atm and temperature of about 300° K. About half the overall energy that may be extracted over an entire cycle is extracted in the movement of the working piston as between FIG. 12 and FIG. 8.

Thus, FIGS. 8 through 12 represent a complete cycle of the system. Over the cycle, the movement of the working piston 706 is converted into electrical energy. A small portion of the electrical energy may be used to operate the system, such as to power the controller 718, power the linear actuators 122 and 422, and the operate the heat pump 720 (shown in FIG. 7). However, the amount of energy used to operate the noted components is well below the amount of energy that can be extracted by the system, using the atmosphere as a solar energy collector.

There are two power generating strokes in the complete cycle. Still considering the example of a 1000 L system using helium as working fluid. At 1 Atm (e.g., approximately 10 newtons/square cm ($N/cm^2$)) pressure, using gamma of 1.7 for helium, each liter of expansion against ambient pressure requires 100 Joules. The heat energy in helium supporting ambient pressure of 10 $N/cm^2$ can be calculated as 100/(gamma−1) or 100/.7 or 143 Joules per liter. Where the volume has changed at the same temperature, the 143 Joules of heat energy remains as the energy per unit mass of helium at full volume is unchanged.

Figure 14:
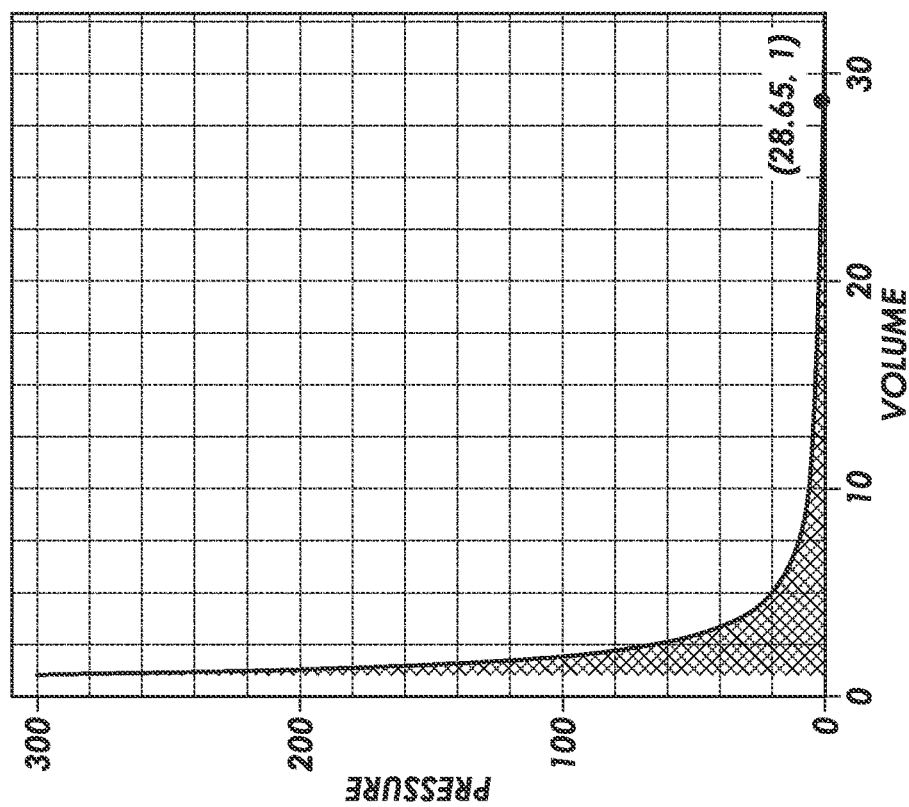
FIG. 14 shows a plot of pressure per liter versus volume of the example working fluid being helium.
Figure 13:
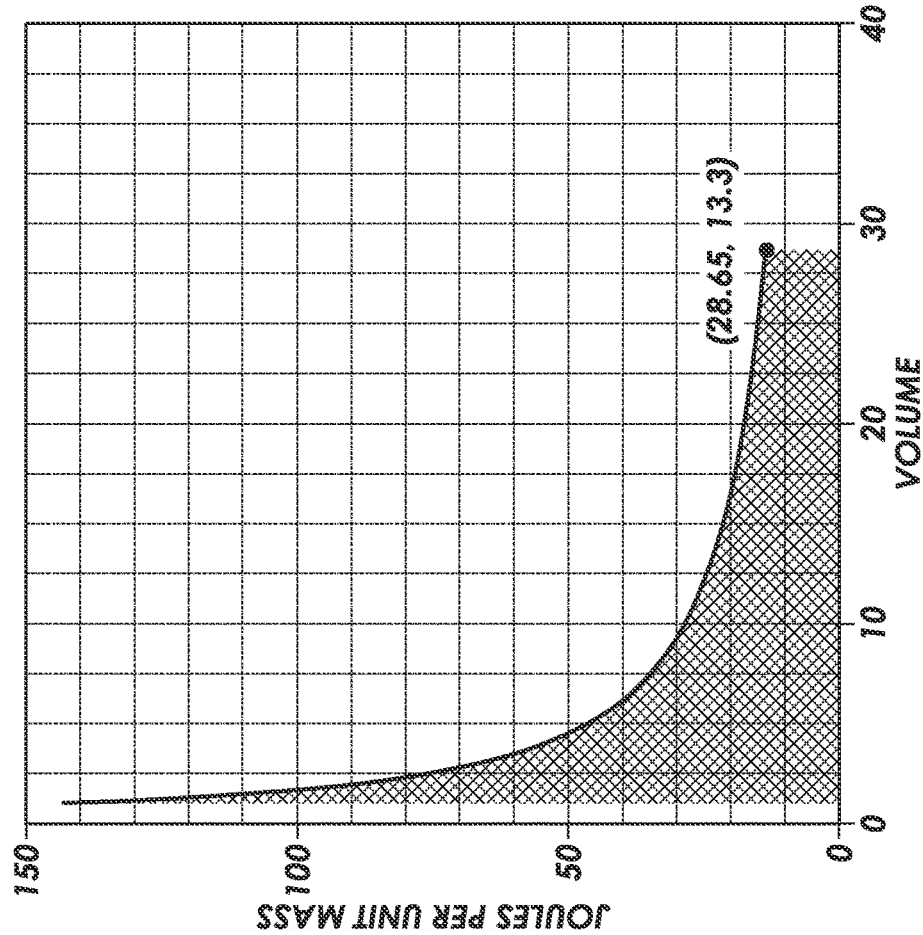
FIG. 13 shows a plot of Joules per unit mass versus volume of the example working fluid being helium.

FIG. 13 shows a plot of Joules per liter versus volume of the example working fluid being helium. Referring simultaneously to FIGS. 8 and 13, FIG. 8 shows the result of enabling helium at 300 Atm and a volume of about 3.4 L to expand by a factor of about 28 to about 95 liters, of which approximately 92 liters (i.e., 95-3.4) raises the working piston 706 to about 10% of its largest working-active volume. The energy versus volume plot of FIG. 13 shows about 13.3 Joules per unit mass remain after lifting the working piston 706. For example, the working-active volume 708 at full volume contains about 1000 L of helium, the unit mass is the mass of 1L of helium at 1 Atm. A total of 130 Joules times 1000 unit masses of helium are converted to work, or in this example 130,000 Joules is applied to raising the working piston 706. The working piston 706 has an ambient opposing force of 1 Atm (e.g., 10 $N/cm^2$), so for the 92 liter rise, 9200 Joules is expended opposing ambient pressure. The extractable work is then 130,000-9200 or 120,800 Joules at the conclusion of expansion as shown in FIG. 8. Stated otherwise, the upward movement of the working piston 706 cause by the differential pressure may result in as much as 120,800 Joules of available energy. FIG. 14 shows a plot of pressure versus volume of the example working fluid being helium. FIG. 14 shows how the expansion factor is determined. In particular, FIG. 14 shows the pressure falls to 1 Atm equalizing pressure on working piston 706 at an expansion of approximately 28.65.

FIG. 9 shows the return to full volume of 1000 L by enabling working fluid in the working cylinder to return to ambient temperature. Both the converted 130,000 Joules of heat energy and the remaining 1000-92 and 908 liters of expansion, using 90,800 additional Joules, are supplied by the atmosphere ambient temperature.

Once at full working-active volume, FIG. 10 shows cryogenic cooling the working fluid back to near 1° K kelvin creating a near vacuum in working-active volume 708. The near vacuum creates a pressure difference of about 1 atmosphere across working piston 706, or about 10 $N/cm^2$. FIG. 11 shows the ending position after unlocking working piston 706, enabling collection of about 100 Joules*1000 L or 100,000 Joules. Stated otherwise, the downward movement of the working piston 706 caused by the differential pressure may result in as much as 100,000 Joules of available energy for extraction/conversion. It is noted that the vacuum may be partial, but even if a 90% pressure reduction is achieved, leaving 1 $N/cm^2$ back pressure in working-active volume 708, such remaining pressure would still result in 90,000 Joules of exported work. However, this specification shows calculations for an ideal system, while acknowledging no physical system is ideal, the calculations show an upper bound, and a real system can be expected to achieve at least 90% of the ideal system performance.

FIG. 12 shows the system after reheating the working fluid to ambient temperature. However, while the temperature has returned to ambient, the warming-active volume 108 is about 3.4 liters, or 300× smaller than working fluid was originally. The difference in volume raises the pressure to about 300 Atm to enable a forceful expansion stroke leading back to FIG. 8.

How quickly the example system can complete a full cycle is dependent upon a number of factors, such as the thermal conductivity of the metallic material making up the working cylinder 702 and warming cylinder 102, the presence or absence of vanes or fins to aid the extraction of heat from the atmospheric, and the amount of airflow by and around the working cylinder 702 and warming cylinder 102. However, the inventor of the current specification believes such a system could operate at one full cycle per second in relatively still air, and even faster with forced airflow. Given the downward movement of the working piston 706 may result 100,000 Joules of energy, and given the partial upward movement of the working piston 706 may result in 120,800 Joules of energy, a complete cycle may result in 220,800 Joules. Given that one Watt is one Joule per second, a single cycle of the example system may thus result in 220,800 Watts or about 220 kiloWatt (kW) gross. The average home uses about 900 kiloWatt hours (kWh) per month, and thus the example system could extract or convert enough energy in just 4 hours of operation to power a home for a month (given sufficient energy storage).

The paragraph immediately above is directed to gross energy available in the working fluid given the change of pressure/volume and temperature. Of course, no system is perfectly efficient. A certain amount of the energy converted may be used to run the system itself, such as the heat pump 720 and the linear actuators 122 and 422. Moreover, the electrical generator 712 will not be 100% efficient at converting movement of the working piston 706 to electrical energy. However, even if the overall efficiency is considered to be 50%— that is, only half the available energy from the working fluid is converted into electrical energy—the system is still a superior source of energy and more environmentally friendly than any currently available source of energy. That is, even if operating at one cycle per second for an hour results in only 110 kWh of energy, the example system could extract or convert enough energy in just under 9 hours of operation to power a home for a month, again given sufficient energy storage. In some cases, the example system may run faster than once cycle per second. For example, when there is high airflow around the device, operation at more than one cycle per second is possible. High airflow around the device may occur when the system is moving relative to the air, such as being associated with a plane, train, or automobile. Thus, even more net energy could be converted with faster operation.

The examples discussed to this point assumed a pressure swing from about 300 Atm to about 1 Atm for a temperature swing of 300° K to about 1° K, respectively, for helium. However, other working fluids may be used. For example, hydrogen, neon, and nitrogen experience a reduction in gas-phase pressure of about 99%, 95%, and 60%, respectively, based on temperature. Thus, assuming gas phase operation for the working fluids, any of the noted fluids may be substituted for helium, with the amount of energy that may be extracted related to the reduction in pressure based on temperature experienced for the working fluid. For example, using nitrogen may reduce the amount of energy that may extracted by about 40% compared to helium as the working fluid; however, the energy that may be extracted based on the expansion and contraction of the nitrogen would still be well above the energy used to operate the system.

Moreover, the embodiments discussed to this point assume a single state of the working fluid throughout the cycle. That is, for the example of helium as the working fluid, the helium remains in the gas phase throughout the example cycle. However, in selecting different working fluids, and assuming for a moment a desire to keep the working fluid in the gas phase throughout the cycle, the cryogenic temperature may be selected to ensure the working fluid stays in the gas phase. The selection of a cryogenic temperature to ensure that the working fluid stays in the gas phase reduces the temperature differential, which in turn reduces the pressure differential; however, given that the example working fluids may experience an exponential relationship of pressure and volume, significant energy can still be extracted even though the pressure and temperature range may be smaller. Further still, using a different working fluid having a smaller pressure and temperature range may enable operating the system at higher frequency, and thus a lower ability to extract energy per cycle may be offset by running the system at more cycles per unit time.

Returning to FIG. 7, the following discussion explains how various assumptions made during the example operation may differ from conditions present in certain embodiments. While the various embodiments discussed to this point have assumed that the working fluid remains in the gas phase throughout the cycle, such is not required. The working fluid and/or cryogenic temperature may be selected to force a state change from gas to liquid during the cooling aspects and a state change from liquid to gas during the warming aspects. In such systems, the movement of the warming piston 106 and cryo piston 116 may not be matched in terms of volume displacement. That is, the cryo piston 116 may utilize less movement as the working fluid would be liquid when entering and residing within cryo cylinder. The volume expansion as between the liquid and gas states (e.g., 600 to 1) is significantly greater than the volume expansion between the gas states alone, so in theory significantly more energy could be extracted in a gas-to-liquid and then liquid-to-gas system. However, gains associated with the higher volume expansion are offset to a lesser extent by the loss of efficiency of the heat exchanger. That is, if the working fluid is condensing from gas to liquid in the heat exchanger, the heat exchanger may be less efficient in exchanging heat between the working fluids as the gas/liquid boundary will move within the heat exchanger as the pressure changes. On the cooling side, the lowered efficiency results in more unwanted heat in the cryogenic region, which then uses more energy to return the cryogenic region to the setpoint temperature. Oppositely, on the warming side, the lowered efficiency of the heat exchanger results in lower temperatures of the working fluid in the gas phase, which may slow the operating frequency of the system as the working fluid may take longer to warm from energy in the atmosphere.

The example system holds working piston 706 in place at various stages throughout the cycle. For example, as discussed herein, this holding is implemented by the down lock 714 and the up lock 716. However, holding the working piston 706 may take any suitable form. For example, holding the working piston 706 in either configuration may involve holding the working piston in place using the electrical generator 712. For example, the magnetic field associated with a stator in the electrical generator 712 may be increased to hold the working piston in place during the noted portions of the cycle. Thus, the down lock 714 and the up lock 716 need not necessarily be a mechanical locks disposed on the sides of the working cylinder 702. Moreover, even if the up lock 716 and the down lock 714 are mechanical locks, those locks may be placed at any suitable location, such as on the connecting rod that connects the working piston 706 to the electrical generator 712. In such a case, a single lock may perform both holding operations. In fact, for an example system operating across a range of temperatures (e.g., heat of the summer versus the cold of winter) the ambient temperature will be different, and thus the "up" location of the working cylinder 706 may change with ambient temperature. Thus, a single lock may not only perform both the up lock and the down lock operations, but may also perform the locking in spite of the changes in working-active volume 708 caused by ambient temperature swings. Further still, holding the working piston 706 in the smallest working-active volume configuration need not take place by physically holding the working piston; rather, a valve may be placed in the tube 710, and closing the valve would have the same effect as holding the working piston 706 in the down configuration.

The various embodiments to this point have assumed that the energy extracted in the volume expansion/contraction of the working fluid is converted to usable work in the form of electrical energy by the electrical generator 712. The presentation in terms of converting to electrical energy was to entertain the idea that the energy extracted using the atmosphere as the solar collector may be used for any suitable purpose, and that energy extracted is well in excess of the energy used to operate the system. However, where other energy sources are available to operate the controller 718, the heat pump 720, and the linear actuators 122 and 422, the movement of the working piston 706 need not be converted to electrical energy, but may be used directly, such as to pump water, turn the wheels of a locomotive, turn the wheels of an automobile, or turn the propellers of an airplane, to name a few examples.

The above discussion is meant to be illustrative of the principles and various embodiments of the present invention. The discussion is directed to a heat engine cycle. Instead of as in an auto engine, beginning with a 10 to 1 volume mechanical compression stroke, the example cycle can be considered to begin with a cryogenic 300 to 1 compression stroke (e.g., FIG. 10 to FIG. 11) with helium working fluid and a 1 degree cryogenic heat reservoir. Numerous variations and modifications will become apparent to those skilled in the art once the above disclosure is fully appreciated. It is intended that the following claims be interpreted to embrace all such variations and modifications.

What is claimed is:

1. A method of extracting energy from atmospheric air, the method comprising:
   warming a first fluid from heat in atmospheric air, the warming creating an increase in volume of the first fluid;
   moving a working piston to a first position by the increase in volume of the first fluid during the warming;
   holding the working piston in the first position to create a first fixed working volume;
   exchanging heat in the first fluid with a second fluid while the working piston is held in the first position, thereby reducing pressure of the first fluid below atmospheric pressure; and then
   releasing the working piston;
   moving the working piston by a first differential pressure between atmospheric pressure and pressure of the first fluid; and converting movement of the working piston caused by the first differential pressure into usable work.

2. The method of claim 1 wherein exchanging heat in the first fluid with the second fluid further comprises moving heat from the first fluid to the second fluid by way of a counter-flow heat exchanger.

3. The method of claim 1 wherein exchanging heat in the first fluid with the second fluid further comprises moving heat while maintaining the first fluid in a gaseous state.

4. The method of claim 1 wherein exchanging heat in the first fluid with the second fluid further comprises moving heat and thereby transitioning the first fluid to a liquid state.

5. The method of claim 1 further comprising, after moving the working piston by the first differential pressure:
holding the working piston in a second position to create a second fixed working volume smaller than the first fixed working volume;
exchanging heat from the second fluid with the first fluid while the working piston is held in the second position, thereby increasing the pressure of the first fluid above atmospheric pressure; and then
releasing the working piston;
moving the working piston by a second differential pressure between atmospheric pressure and the pressure of the first fluid; and
converting movement of the working piston caused by the second differential pressure into usable work.

6. The method of claim 5 wherein:
converting movement of the working piston caused by the first differential pressure further comprises converting the movement of the working piston caused by the first differential pressure to electrical energy using an electrical generator; and
converting movement of the working piston caused by the second differential pressure further comprises converting the movement of the working piston caused by the second differential pressure to electrical energy using the electrical generator.

7. The method of claim 6 wherein the electrical generator is a linear electric motor.

8. The method of claim 1 wherein the first fluid is at least one selected from a group consisting of: helium; neon; and nitrogen.

9. A system for recovering atmospheric energy, the system comprising:
a first warming cylinder having a first warming piston therein, the first warming cylinder exposed to atmospheric temperature, and the first warming cylinder and the first warming piston define a first warming-active volume;
a first cryo cylinder having a first cryo piston therein, the first cryo cylinder disposed within a region of cryogenic temperature, and the first cryo cylinder and the first cryo piston define a first cryo-active volume;
a second warming cylinder having a second warming piston therein, the second warming cylinder exposed to atmospheric temperature, and the second warming cylinder and the second warming piston define a second warming-active volume;
a second cryo cylinder having a second cryo piston therein, the second cryo cylinder disposed within the region of cryogenic temperature, and the second cryo cylinder and the second cryo piston define a second cryo-active volume;
a heat exchanger defining a first flow path that fluidly couples the first warming-active volume to the first cryo-active volume, and a second flow path that fluidly couples the second warming-active volume to the second cryo-active volume;
a working cylinder having a working piston therein, the working cylinder exposed to atmospheric temperature, and the working cylinder and the working piston defining a working volume fluidly coupled to the first warming-active volume;
a first fluid disposed in the first warming-active volume, the first cryo-active volume, and the working volume;
a second fluid disposed in the second warming-active volume and the second cryo-active volume;
a means for extracting energy from movement of the working piston;
a first means for controlling position of the first warming piston and the first cryo piston;
a second means for controlling position of the second warming piston and the second cryo piston;
a controller coupled to the means for extracting energy, the first means for controlling position, and the second means for controlling position, the controller configured to:
position the first warming piston and the first cryo piston such that a majority of the first fluid resides in the first warming-active volume and the working volume, thereby warming the first fluid from heat in atmospheric air, and the warming creates an increase in volume of the first fluid and moves the working piston to a first position;
hold the working piston in the first position to create a first fixed working volume;
move the first warming piston and the first cryo piston, and move the second warming piston and the second cryo piston, to exchange heat in the first fluid with the second fluid by way of the heat exchanger while the working piston is held in the first position, thereby reducing pressure of the first fluid below atmospheric pressure and creating a first differential pressure across the working piston; and then
release the working piston; and
convert movement of the working piston caused by the first differential pressure into usable work by the means for extracting energy.

10. The system of claim 9 wherein the controller is further configured to, after converting movement of the working piston caused by the first differential pressure into usable work:
hold the working piston in a second position to create a second fixed working volume smaller than the first fixed working volume;
move the first warming piston and the first cryo piston, and move the second warming piston and the second cryo piston, to exchange heat in the second fluid with the first fluid by way of the heat exchanger while the working piston is held in the second position, thereby increasing the pressure of the first fluid above atmospheric pressure and creating a second differential pressure; and then
release the working piston; and
convert movement of the working piston caused by the second differential pressure into usable work by the means for extracting energy.

11. The system of claim 9 wherein the first means for controlling position comprises:
a connecting rod coupled on a first end to the first warming piston and coupled on a second end to the first cryo piston; and a means for translating the connecting rod, the first warming piston, and the first cryo piston.

12. The system of claim 11 wherein the means for translating comprises an electric motor.

13. The system of claim 9 wherein the means for extracting energy comprises a linear electric motor.

14. The system of claim 9 wherein the first fluid is at least one selected from a group consisting of: helium; neon; and nitrogen.

15. The system of claim 9 wherein the second fluid is helium.

16. The system of claim 9 wherein the first fluid remains in a gas phase during movement between the first warming piston and first cryo piston.

17. The system of claim 9 wherein the second fluid remains in a gas phase during movement between the second warming piston and second cryo piston.

18. The system of claim 9 wherein the first fluid changes from a gas phase to a liquid phase during movement between the first warming piston and first cryo piston.

* * * * *